(12) United States Patent
Chen et al.

(10) Patent No.: US 12,341,912 B2
(45) Date of Patent: Jun. 24, 2025

(54) METHOD FOR CONFIRMING OWNERSHIP OF DIGITAL ASSETS BASED ON HASH ALGORITHM AND METHOD FOR TRACING TO A SOURCE OF DIGITAL ASSETS BASED ON HASH ALGORITHM

(71) Applicants: NANJING UNIVERSITY, Jiangsu (CN); MATRICTIME DIGITAL TECHNOLOGY CO., LTD, Nanjing Area (CN)

(72) Inventors: Zengbing Chen, Nanjing (CN); Tongkai Xu, Nanjing (CN); Mengya Zhu, Nanjing (CN); Boohea Foo, Nanjing (CN); Ge Yang, Nanjing (CN); Chengyang Zhao, Nanjing (CN)

(73) Assignees: NANJING UNIVERSITY, Jiangsu (CN); MATRICTIME DIGITAL TECHNOLOGY CO., LTD, Jiangsu (CN)

( * ) Notice: Subject to any disclaimer, the term of this patent is extended or adjusted under 35 U.S.C. 154(b) by 0 days.

(21) Appl. No.: 18/245,383

(22) PCT Filed: Sep. 14, 2022

(86) PCT No.: PCT/CN2022/118786
§ 371 (c)(1),
(2) Date: Mar. 15, 2023

(87) PCT Pub. No.: WO2023/178941
PCT Pub. Date: Sep. 28, 2023

(65) Prior Publication Data
US 2024/0297797 A1    Sep. 5, 2024

(30) Foreign Application Priority Data
Mar. 21, 2022 (CN) .......................... 202210274573.8

(51) Int. Cl.
*H04L 9/32* (2006.01)
*H04L 9/06* (2006.01)

(52) U.S. Cl.
CPC .......... *H04L 9/3268* (2013.01); *H04L 9/0643* (2013.01); *H04L 9/3247* (2013.01)

(58) Field of Classification Search
None
See application file for complete search history.

(56) References Cited

U.S. PATENT DOCUMENTS

| 11,210,372 B2* | 12/2021 | Savanah | ................ G06F 8/65 |
| 2020/0234386 A1* | 7/2020 | Blackman | ................ H04L 9/30 |

(Continued)

FOREIGN PATENT DOCUMENTS

| CN | 107566116 A | 1/2018 |
| CN | 109033789 A | 12/2018 |

(Continued)

OTHER PUBLICATIONS

International Search Report and Written Opinion from International Application No. PCT/CN2022/118786 mailed Nov. 9, 2022.

(Continued)

*Primary Examiner* — Fatoumata Traore
(74) *Attorney, Agent, or Firm* — Dorsey & Whitney LLP

(57) ABSTRACT

Method for confirming ownership of digital assets based on hash algorithm and method for tracing to a source of digital assets based on hash algorithm are provided. Entities involved in confirming the ownership of digital assets include an original user, a CA authentication center and a digital asset authentication center. The process of confirming the ownership includes generating a one-time CA certificate by the original user, authenticating the digital assets by the digital asset authorization center and the original user, generating an ownership confirming document by the origi- (Continued)

nal user, creating a quantum digital signature by a three-party, and the like. The method for tracing includes generating subsidiary documents in real time, constructing a unique identity for a digital asset at an accessing moment, traceability analysis, and so on.

17 Claims, 2 Drawing Sheets

(56) References Cited

U.S. PATENT DOCUMENTS

| | | | |
|---|---|---|---|
| 2021/0110390 A1* | 4/2021 | Janaudy | G06Q 20/4016 |
| 2021/0327008 A1* | 10/2021 | Salah | G06F 8/38 |

FOREIGN PATENT DOCUMENTS

| | | |
|---|---|---|
| CN | 110335149 A | 10/2019 |
| CN | 111506590 A | 8/2020 |
| CN | 112651052 A | 4/2021 |
| CN | 113938281 A | 1/2022 |
| CN | 114065247 A | 2/2022 |
| CN | 114362971 A | 4/2022 |
| WO | 2022016102 A1 | 1/2022 |

OTHER PUBLICATIONS

First Office Action for Chinese Patent Application No. 202210274573.8 mailed Apr. 22, 2022.
Second Office Action for Chinese Patent Application No. 202210274573.8 mailed May 9, 2022.

* cited by examiner

METHOD FOR CONFIRMING OWNERSHIP OF DIGITAL ASSETS BASED ON HASH ALGORITHM AND METHOD FOR TRACING TO A SOURCE OF DIGITAL ASSETS BASED ON HASH ALGORITHM

TECHNICAL FIELD

The present disclosure relates to the technical field of digital asset security, and more particularly, relates to a method for confirming ownership of digital assets based on hash algorithm and a method for tracing to a source of digital assets based on hash algorithm.

BACKGROUND

In the fast-developing digital network era, with the rapid advancement of digitalized information, people have higher and higher requirements for ownership confirmation and protection, authenticity and anti-tampering of digital assets in the Internet of Value. According to conservation of matter, material assets in human society possess the characteristic of uniqueness, and it takes a certain amount of cost to replicate or consume one piece of material asset. Nevertheless, if it is a piece of data asset, the marginal cost to replicate the piece of data asset is almost zero and it may be almost infinitely replicable, which is very unfavorable for defining the attributes of the asset. On the other hand, as digitalization permeates every corner of the current development, data capitalization and asset digitalization have gradually become a trend, and digital asset protection has been a very significant proposition and challenge in the industry. In order to protect valuable digital asset information, it is primary to guarantee the integrity of the information, ensuring that the information is not tampered. Therefore, it is compulsory to investigate a real-time integrity protection method for digital assets and to create a safer method for confirming ownership of the digital assets.

Hash algorithm is an effective way to achieve information integrity. For example, when transmitting information between two parties, a hash algorithm based on a Toeplitz matrix is an effective and unconditionally secure authentication solution for message. For a digital asset in the Internet of Value, there may be different users accessing this digital asset in different scenarios, and corresponding subsidiary documents will undoubtedly be generated while different users accessing this digital asset with different purposes. Therefore, it is required to preserve the integrity of the digital asset all the time. To realize this purpose, it is compulsory to assign a real-time and unique asset identity to the digital asset. The real-time identity of the digital asset reflects real-time integrity of the digital asset, which may further reflect the traceability of the digital asset.

As for products, basic characteristic of traceability is: being able to realize a full-range tracing, including tracing for early warning of product security, a traceable source, a searchable direction, responsibility identification and product recall. For a digital asset in the Internet of Value, fundamental characteristic of traceability is embodied in the real-time identity of the digital asset, and once a real-time identity of the digital asset is given, the integrity of the digital asset and the above-mentioned basic characteristic of traceability are given. How to achieve traceability of a digital asset? Obviously, as long as the real-time identity of the digital asset is implemented, the traceability is achieved. At present, no relevant research on real-time and unique identity of a digital asset may be found in related technologies. In view of this, the present disclosure provides a method for confirming ownership of digital assets based on hash algorithm and a method for tracing to a source of digital assets based on hash algorithm, so that the topic of information integrity is further enriched, and the high-efficiency development of digital information is better promoted.

SUMMARY

Objective of the present disclosure: objective of the present disclosure is to provide a method for confirming ownership and tracing to a source of digital assets based on hash algorithm, in order to solve the problem that a real-time and unique identity of a digital asset has not yet been studied in existing technologies. The present disclosure may confirm the ownership of a digital asset in real time in the Internet of Value, while constructing a real-time and unique identity of the digital asset for tracing to a source.

Technical solution: a method for confirming ownership and tracing to a source of digital assets based on hash algorithm is provided, which include the following steps:

(1) issuing a CA user certificate to an original user and generating a service serial number by a CA authentication center; authenticating a private CA user certificate $CA_2$ of the CA user certificate with the original user by the CA authentication center; after the authentication is successful, generating a one-time CA certificate otCA by each of the CA authentication center and the original user;

(2) sending a digital asset M to a digital asset authentication center and meanwhile generating a service serial number o2 by the original user; performing authentication on the digital asset M with the original user by the digital asset authentication center, and after the authentication is successful, generating an authentication document of the digital asset M by each of the digital asset authentication center and the original user;

(3) generating a service serial number o3 of quantum digital signature and generating a signature document $doc_M$ by the original user; conducting a three-party quantum digital signature for the signature document $doc_M$ by the CA authentication center, the digital asset authentication center and the original user, where the original user is a signing party, the CA authentication center and the digital asset authentication center are signature verification parties; after successfully verifying the signature by both the CA authentication center and the digital asset authentication center, conducting an identity verification by the CA authentication center and conducting a document verification by the digital asset verification center; when both the identity verification and the document verification are successful, ownership confirmation of the digital asset is successful while producing a service serial number o4 and entering next step; otherwise, verification of the signature is unsuccessful, the current process of confirming ownership of the digital asset is terminated or a new process of confirming ownership is initiated; and (4) generating an ownership confirmation document of the digital asset M by the original user.

Further, the authenticating private CA user certificate $CA_2$ of the CA user certificate with the original user by the CA authentication center includes:

Approach 1: 1) obtaining and choosing a set of n-bit random number $s_1$ locally by the CA authentication center; generating an irreducible polynomial p(x) of order n using the n-bit random number $s_1$, and denoting the n-bit character string, formed by coefficients of terms of respective orders except the highest order of the irreducible polynomial, as str1;

2) sharing two sets of quantum secret keys $s_2$ and v by the CA authentication center and the original user; the length of $s_2$ being n and the length of v being 2n, and respectively using the two secret keys as an input random number for a hash function and for encryption for the hash function;

3) obtaining a hash function $h_{p,s_2}$ based on a linear feedback shift register by the CA authentication center from choosing the irreducible polynomial p(x) of order n and the shared secret key $s_2$ as an input random number; then computing a hash value of the private CA user certificate, which is denoted as $h_{p,s_2}(CA_2)$, using the hash function; encrypting the hash value and the character string str1 by using the shared secret key v, and the encryption is performed using an XOR operation to obtain an encryption result $v \oplus ((h_{p,s_2}(CA_2), str1)$ by the CA authentication center;

4) sending the encryption result $v \oplus (h_{p,s_2}(CA_2), str1)$ to the original user by the CA authentication center; after receiving the encryption result by the original user, decrypting the encryption result using the shared secret key v by the original user to obtain the hash value $h_{p,s_2}(CA_2)$ and the character string str1; generating an irreducible polynomial p'(x) of order n on the GF(2) domain by successively corresponding respective bits in the character string str1 to coefficients of terms of respective orders other than a highest order of the polynomial, where a coefficient of the highest order of term of the polynomial is 1 by the original user; generating a hash function $h'_{p,s_2}$ based on a linear feedback shift register by further choosing the irreducible polynomial p'(x) and the shared secret key string $s_2$ as an input random number by the original user; computing a hash value of the private CA user certificate $CA_2$, which is denoted as $h'_{p,s_2}(CA_2)$, using the hash function $h'_{p,s_2}$; in the case that the computed hash value $h'_{p,s_2}(CA_2)$ by the original user is equal to the hash value $h_{p,s_2}(CA_2)$ obtained through decryption, the authentication is successful; otherwise, the authentication is unsuccessful, returning and re-issuing the CA user certificate to the original user by the CA authentication center; or approach 2: 1) sharing a string of n-bit random number $s_1$ and performing a pre-generation of an irreducible polynomial p(x) by the CA authentication center and the original user;

2) sharing secret keys $s_2$ and v between the CA authentication center and the original user; generating a hash function $h_{p,s_2}$ based on a linear feedback shift register by the CA authentication center using its own secret key $s_2$, serving as an input random number together with the pre-generated irreducible polynomial p(x); then computing a hash value of the private CA user certificate $CA_2$, which is denoted a $sh_{p,s_2}(CA_2)$, using the hash function;

3) encrypting the hash value $h_{p,s_2}(CA_2)$ using the secret key v of the CA authentication center, and sending an encrypted hash value $h_{p,s_2}(CA_2) \oplus v$ to the original user from the CA authentication center; performing decryption of the received result using the shared secret key v to obtain $h_{p,s_2}(CA_2)$ by the original user; subsequently, generating a hash function $h'_{p,s_2}$ based on a linear feedback shift register by the original user using its own secret key $s_2$, serving as an input random number together with the pre-generated irreducible polynomial p(x); computing a hash value of the private CA user certificate $CA_2$, which is denoted as $h'_{p,s_2}(CA_2)$, using the hash function $h'_{p,s_2}$; in the case that the hash value $h'_{p,s_2}(CA_2)$ being equal to the hash value $h_{p,s_2}(CA_2)$ obtained through decryption, the authentication is successful; otherwise, the authentication is unsuccessful, returning and re-issuing the CA user certificate to the original user by the CA authentication center.

Further, generating the irreducible polynomial p(x) of order n using the n-bit random number $s_1$ in the approach 1 includes:

a) firstly, generating a polynomial of order n in the GF(2) domain by successively corresponding respective bits in the n-bit random number $s_1$ to coefficients of terms of respective orders other than a highest order of the polynomial, where a coefficient of the highest order is 1;

b) furthermore, verifying whether the polynomial is an irreducible polynomial; in the case that a verification result being no, re-generating another set of random number by the CA authentication center; with this newly generated random number, returning to step a) to re-generate the polynomial and to verify; if the verification result is yes, stopping the verification and obtaining the irreducible polynomial by the CA authentication center.

Further, pre-generation of the irreducible polynomial p(x) in the approach 2 includes:

a) firstly, generating a polynomial of order n in the GF(2) domain by each of the CA authentication center and the original user by successively corresponding respective bits in the n-bit random number to coefficients of terms of respective orders other than a highest order of the polynomial, where a coefficient of the highest order is 1;

b) furthermore, verifying whether the polynomial is an irreducible polynomial; in the case that the verification result is no, sharing another set of re-generated random number by the CA authentication center with the original user; with this newly generated random number, return to step a) to re-generate the polynomial and to verify; in the case that the verification result is yes, stopping the verification and obtaining the respective irreducible polynomial by both the CA authentication center and the original user.

Further, prior to step a), in the case that the last bit of the random number is 0, then letting the last bit of the random number to be 1; or, in the case that the last bit of the random number is 0, then re-generating a random number until the last bit of the generated random number is 1.

Further, generating the one-time CA certificate otCA respectively by each of the CA authentication center and the original user includes:

firstly, after verifying the private CA user certificate $CA_2$ by the CA authentication center and the original user, sharing an encryption secret key R between the CA authentication center and the original user; obtaining an encryption value $h_{p,s_2}(CA_2) \oplus R$ by both the CA authentication center and the original user using the encryption secret key R to encrypt $h_{p,s_2}(CA_2)$ which is obtained during the process of verification;

then, generating, by each of the CA authentication center and the original user, a one-time CA certificate otCA using the encryption value $h_{p,s_2}(CA_2) \oplus R$, the service serial number o1 of issuance of the CA user certificate and institution information ca of the CA authentication center, that is:

$$otCA=(h_{p,s_2}(CA_2)\oplus R,o1,ca).$$

Further, the performing authentication with the original user by the digital asset authentication center includes:

approach 3: 1) obtaining and choosing a set of n-bit random number $k_1$ locally by the digital asset authentication center; generating an irreducible polynomial q(x) of order n using the n-bit random number $k_1$, and denoting an n-bit character string as str2, which is formed by coefficients of terms of respective orders except the highest order of the irreducible polynomial;

2) sharing two sets of quantum secret keys $k_2$ and u between the digital asset authentication center and the original user; the length of $k_2$ being n and the length of u being 2n, and using the two secret keys respectively as an input random number for a hash function and for encryption of the hash function;

3) obtaining a hash function $h_{q,k_2}$ based on a linear feedback shift register by the digital asset authentication center by choosing the irreducible polynomial q(x) of order n and the shared secret key $k_2$ as an input random number; computing a hash value of the digital asset M, which is denoted as $h_{q,k_2}(M)$, by using the hash function; encrypting, by the digital asset authentication center, the hash value and the character string str2 by using the shared secret key u, and performing the encryption using an XOR operation to obtain an encryption result $u\oplus(h_{q,k_2}(M),str2)$;

4) sending the encryption result $u\oplus(h_{q,k_2}(M),str2)$ to the original user from the digital asset authentication center; after receiving the encryption result by the original user, decrypting, by the original user, the encryption result using the shared secret key u to obtain the hash value $h_{q,k_2}(M)$ and the character string str2; generating, by the original user, an irreducible polynomial q'(x) of order n on the GF(2) domain by successively corresponding respective bits in the character string str2 to coefficients of terms of respective orders other than a highest order of the polynomial, where a coefficient of the highest order is 1; generating a hash function $h'_{q,k_2}$ based on a linear feedback shift register by further choosing the irreducible polynomial q'(x) along with the shared secret key string $t_2$ as an input random number; computing a hash value of the digital asset M, which is denoted as $h'_{q,k_2}(M)$, using the hash function $h'_{q,k_2}$; in a case that the computed hash value $h'_{q,k_2}(M)$ by the original user is equal to the hash value $h_{q,k_2}(M)$ obtained through decryption, the authentication succeeds; otherwise, the authentication fails, returning and authenticating again; or approach 4: 1) sharing a string of n-bit random number $k_1$ between the digital asset authentication center and the original user and performing pre-generation of the irreducible polynomial q(x);

2) sharing secret keys $k_2$ and u between the digital asset authentication center and the original user; obtaining a hash function $h_{q,k_2}$ based on a linear feedback shift register by the digital asset authentication center from using the secret key $k_2$ of the digital asset authentication center as an input random number together with the pre-generated irreducible polynomial q(x); then computing a hash value of the digital asset M, which is denoted as $h_{q,k_2}(M)$, by using the hash function $h_{q,k_2}$;

3) encrypting the hash value $h_{q,k_2}(M)$ using its own secret key u by the digital asset authentication center, and sending an encrypted hash value $h_{q,k_2}(M)\oplus u$ to the original user from the digital asset authentication center; performing decryption of a received result using the shared secret key u to obtain $h_{q,k_2}(M)$ by the original user; subsequently, obtaining, by the original user, a hash function $h'_{q,k_2}$ based on a linear feedback shift register using the secret key $k_2$, serving as an input random number together with the pre-generated irreducible polynomial; computing a hash value of the digital asset M, which is denoted as $h'_{q,k_2}(M)$, using the hash function $h'_{q,k_2}$; in a case that the hash value $h'_{q,k_2}(M)$ is equal to the hash value $h_{q,k_2}(M)$ obtained through decryption, authentication succeeds; otherwise, authentication fails, returning and authenticating again.

Further, generating the authentication document of the digital asset M by each of the digital asset authentication center and the original user includes:

after the authentication of the digital M is successful, generating an authentication document $H_M$ of the digital asset M by each of the digital asset authentication center and the original user, each using the hash value $h_{q,k_2}(M)$, the service serial number o2 of sending the digital asset M and institution information da of the digital asset authentication center, that is:

$$H_M=(h_{q,k_2}(M),o2,da).$$

Further, generating the signature document $doc_M$ includes:

generating the signature document $doc_M$ by the original user, using the authentication document $H_M$ of the digital asset M, the one-time CA certification otCA, the service serial number o3 of quantum digital signature, the institution information ca of the CA authentication center and the institution information da of the digital asset authentication center, that is:

$$doc_M=(H_M,otCA,o3,ca,da).$$

Further, conducting the three-party quantum digital signature for the signature document $doc_M$ by the CA authentication center, the digital asset authentication center and the original user, where the original user is a signing party, the CA authentication center and the digital asset authentication center are signature verification parties; when successfully verifying the signature by both the CA authentication center and the digital asset authentication center, conducting an identity verification by the CA authentication center and conducting a document verification by the digital asset verification center includes:

S1. Obtaining, by the original user, a random number locally to generate an irreducible polynomial l(x), and denoting a character string as str3, which is formed by coefficients of terms of respective orders except the highest order of the irreducible polynomial l(x);

S2. performing a secret key negotiation between the original user and the CA authentication center, and respectively obtaining a shared secret key $x_1$ and a shared secret key $y_1$ by the original user and the CA authentication center; performing a secret key negotiation between the original user and the digital asset authentication center, and respectively obtaining a shared secret key $x_2$ and a shared secret key $y_2$ by the original user and the digital asset authentication center; where, the length of $x_1$ is identical to the length of $x_2$, the length of $y_1$ is identical to the length of $y_2$, and the length of $y_1$ is twice as long as the length of $x_1$; performing an XOR operation on the secret keys $x_1$, $y_1$, $x_2$ and $y_2$ by the original user to obtain secret keys $x_3$ and $y_3$ as follows:

$$x_3 = x_1 \oplus x_2;$$

$$y_3 = y_1 \oplus y_2.$$

S3. generating a hash function $h_{l,x_3}$ by the original user by choosing the irreducible polynomial l(x) and the secret key $x_3$ used as an input random number; performing a hash operation on the signature document $doc_M$ using the hash function $h_{l,x_3}$ to obtain a hash value $h_{l,x_3}(doc_M)$; encrypting, by the original user, the hash value $h_{l,x_3}(doc_M)$ and the character string str3 using the secret key $y_3$, and transmitting an encrypted value $(h_{l,x_3}(doc_M), str3) \oplus y_3$ and the signature document $doc_M$ to the CA authentication center by the original user;

S4. after receiving $(h_{l,x_3}(doc_M), str3) \oplus y_3$ and the signature document $doc_M$ by the CA authentication center, sending its secret keys $x_1$, $y_1$, $(h_{l,x_3}(doc_M), str3) \oplus y_3$ and the signature document $doc_M$ from CA authentication center to the digital asset authentication center; the digital asset authentication center, upon reception of the secret keys and the signature document, sending its secret keys $x_2$ and $y_2$ to the CA authentication center; an exchange of information of the two parties taking place over an authenticated channel to prevent information from being tampered; at this time, the CA authentication center and the digital asset authentication center both possess the secret keys $x_1$, $y_1$, $x_2$, $y_2$, $(h_{l,x_3}(doc_M), str3) \oplus y_3$ and the signature document $doc_M$;

S5. after completing the exchange of information, performing an XOR operation on the secret keys $x_1$, $y_1$, $x_2$, $y_2$ owned by the CA authentication center to obtain secret keys $x_3'$ and $y_3'$, where:

$$x_3' = x_1 \oplus x_2;$$

$$y_3' = y_1 \oplus y_2;$$

decrypting the encrypted value $(h_{l,x_3}(doc_M), str3) \oplus y_3$ using the secret key $y_3'$ by the CA authentication center to obtain $h_{l,x_3}(doc_M)$ and the character string str3; then generating an irreducible polynomial l'(x) by successively corresponding respective bits in the character string str3 to coefficients of terms of respective orders other than a highest order of the polynomial, where a coefficient of the highest order is 1; generating a hash function $h_{l',x_3}$ using the irreducible polynomial l'(x) and the secret key $x_3'$ as an input random number by the CA authentication center; performing, by the CA authentication center, a hash operation using the hash function $h_{l',x_3}$ on the signature document $doc_M$ to obtain a hash value $h_{l',x_3}(doc_M)$; comparing the computed hash value $h_{l',x_3}(doc_M)$ with the decrypted $h_{l,x_3}(doc_M)$ by the CA authentication center; when being equal, the signature verification succeeds, otherwise the signature verification fails;

S6. verifying the signature by the digital asset authentication center by using the same way as the CA authentication center;

S7. in a case that the signature is successfully verified by both the CA authentication center and the digital asset authentication center, conducting an identity verification by the CA authentication center and conducting a document verification by the digital asset verification center; the specific procedure is: comparing the otCA in the signature document $doc_M$ of the CA authentication center with the otCA generated by the CA authentication center to determine consistency, in a case of being consistent, an identity verification succeeds; comparing the $H_M$ in the signature document $doc_M$ of the digital asset authentication center with the $H_M$ generated by the digital asset authentication center to determine consistency, in a case of being consistent, a document verification succeeds; when the signature verification, the identity verification and the document verification are all successful, ownership confirmation of the digital asset is successful while producing a service serial number o4 and entering next step; otherwise, a current ownership confirmation of the digital asset is unsuccessful, and the ownership confirmation of the digital asset is terminated or a new ownership confirmation is initiated.

Further, the generating the ownership confirmation document of the digital asset M by the original user includes:

denoting the timestamp corresponding to a successfully confirming ownership operation of the digital asset as timestamp1 by the original user; next, generating an ownership confirmation document M of the digital asset M using the hash value $h_{l,x_3}(doc_M)$ of the signature document, the signature document $doc_M$, the timestamptimestamp1, and the service serial number o4 by the original user:

$$\overline{M} = (h_{l,x_3}(doc_M), doc_M, \text{timestamp1}, o4).$$

Further, the digital asset authentication center includes a first interface unit, a first quantum security unit connected to the first interface unit, and a digital asset authentication unit connected to the first quantum security unit;

the first interface unit is configured to allow connection and communication interaction between the digital asset authentication center and other exterior systems;

the first quantum security unit includes a first hash algorithm module, a first encryption module, a first decryption module, a first true quantum random number generator and a first secret key storage module which are sequentially connected; the first hash algorithm module is configured to generate hash functions to perform hash computation of information; the first encryption module is configured to perform encryption operation; the first decryption module is configured to perform decryption operation; the first true quantum random number generator is configured to generate true quantum random numbers; the first secret key storage module is configured to store secret keys;

the digital asset authentication unit includes a digital asset storage module, a first authentication module, a quantum digital signature module, a first logging module and a first backup module which are sequentially connected; the digital asset storage module is configured to store documents; the first authentication module is configured to perform authentication operations; the quantum digital signature module is configured to perform quantum digital signing operation for generated signature documents; the first logging module is configured to record a signature verification result of a quantum digital signature and a result of authentication; the first backup module is configured to back up recorded data of the first logging module.

A method for tracing to a source of digital assets based on hash algorithm is also provided, which includes steps as follows:

(1) an initial access moment: confirming an ownership of digital asset M by the original user using the above-mentioned method for confirming ownership; after the confirmation is successful, obtaining an ownership confirmation document, which is a unique identity of the digital asset at the initial access moment; and uploading the digital asset M along with the ownership confirmation document to a digital asset server;

(2) an access moment: when accessing the digital asset M on the digital asset server by an access user, generating a subsidiary document in real time by the digital asset server; the subsidiary document includes but is not limited to a timestamp and identity information of the access user;

(3) constructing a unique identity of the digital asset at the access moment: conducting an authentication of an identity document by the digital asset server and the digital asset authentication center, obtaining a hash value of the identity document, which is a unique identity of the digital asset at a current access moment; forming the identity document by nesting a unique identity of the digital asset of a previous access moment and a subsidiary document of the current access moment;

(4) traceability analysis: obtaining a unique identity of the digital asset at a final access moment by repeating step (2) and step (3) a multitude of times; tracing the history of the unique identity of the digital asset at the final access moment, thus completing the traceability analysis of the digital asset.

Further, when accessing the digital asset M on the digital asset server by an access user, generating the subsidiary document in real time by the digital asset server includes:

denoting the initial access moment as moment to, at which the digital asset M is confirmed and uploaded to the digital asset server;

1) when the access user accessing the digital asset M at a moment $t_1$, generating a subsidiary document $c_1$ with a length of $n_1$ in real time by the digital asset server;

2) when the access user accessing the digital asset M at a moment $t_2$, generating a subsidiary document $c_2$ with a length of $n_2$ in real time by the digital asset server;

3) in a similar manner, when the access user accessing the digital asset M at a moment $t_k$, generating a subsidiary document $c_k$ with a length of $n_k$ in real time by the digital asset server; after undergoing the above-mentioned procedure, generating a subsidiary document correspondingly every time the digital asset M is accessed.

Further, conducting the authentication of the identity document by the digital asset server and the digital asset authentication center, obtaining a hash value of the identity document, which is a unique identity of the digital asset at a current access moment; forming the unique identity by nesting a unique identity of the digital asset of a previous access moment and a subsidiary document of the current access moment includes:

1) at moment $t_0$, confirming the ownership of the digital asset M to obtain an ownership confirmation document $\overline{c}_0$ of the digital asset M; $\overline{c}_0$ is a unique identity of the digital asset accessed at moment to;

2) at moment $t_1$, forming an identity document $\tilde{c}_1 = (\overline{c}_0, c_1)$ by nesting the unique identity $\overline{c}_0$ of the digital asset M accessed at access moment to, with the subsidiary document $c_1$ of length $n_1$ generated in real time by accessing the digital asset M by the access user at moment $t_1$; authenticating the identity document $\tilde{c}_1$ by the digital asset server and the digital asset authentication center; obtaining, after authentication, a hash value $\overline{c}_1$ of the identity document $\tilde{c}_1$; the hash value $\overline{c}_1$ is a unique identity of the digital asset accessed at moment $t_1$;

3) in a similar manner, at moment $t_k$, forming an identity document $\tilde{c}_k = (\overline{c}_{k-1}, c_k)$ by nesting a unique identity $\overline{c}_{k-1}$ of the digital asset accessed at access moment $t_{k-1}$ by the digital asset M, with a subsidiary document $c_k$ of length $n_k$ generated in real time by the digital asset M accessed by the access user at moment $t_k$; authenticating the identity document $\tilde{c}_k = (c_{k-1}, c_k)$ by the digital asset server and the digital asset authentication center using the same approach used to authenticate the identity document $\tilde{c}_1$; obtaining, after authentication, a hash value $\overline{c}_k$ of the identity document $\tilde{c}_k$; the hash value $\overline{c}_k$ is a unique identity of the digital asset accessed at moment $t_k$.

Further, the authenticating the identity document $\tilde{c}_1$ by the digital asset server and the digital asset authentication center; obtaining, after authentication, the hash value $\overline{c}_1$ of the identity document $\tilde{c}_1$ includes:

approach 5: 1) obtaining and choosing a set of n-bit random number $z_1$ locally by the digital asset server; generating an irreducible polynomial f(x) of order n using the n-bit random number $z_1$, and denoting an n-bit character string a sstr4, formed by coefficients of terms of respective orders except the highest order of the irreducible polynomial;

2) sharing two sets of quantum secret keys $z_2$ and j by the digital asset server and the digital asset authentication center; the length of $z_2$ is n and the length of j is 2n, and using the two secret keys respectively as an input random number for a hash function and for encryption of the hash function.

3) obtaining a hash function $h_{f_{z_2}}$ based on a linear feedback shift register by the digital asset server from choosing the irreducible polynomial f(x) of order n and the shared secret key $z_2$ as an input random number; then computing a hash value of $\tilde{c}_1$, which is denoted as $h_{f_{z_2}}(\tilde{c}_1)$, using the hash function; encrypting, by the digital asset server, the hash value and the character string str4 by using the shared secret key j, and performing the encryption using an XOR operation to obtain an encryption result $j \oplus (h_{f_{z_2}}(\tilde{c}_1), str4)$;

4) sending the encryption result $j \oplus (h_{f_{z_2}}(\tilde{c}_1), str4)$ from the digital asset server to the digital asset authentication center; after the digital asset authentication center receiving the encryption result, decrypting the encryption result using the shared secret key j by the digital asset authentication center to obtain the hash value $h_{f_{z_2}}(\tilde{c}_1)$ and the character string str4; generating an irreducible polynomial f'(x) of order n on the GF(2) domain by the digital asset authentication center by successively corresponding respective bits in the character string str4 to coefficients of terms of respective orders other than a highest order of the polynomial, where a coefficient of the highest order is 1; generating a hash function $h'_{f_{z_2}}$ based on a linear feedback shift register by the digital asset authentication center from further choosing the irreducible polynomial f'(x) and the shared secret key string $z_2$ which is used as an input random number; computing a hash value of $\tilde{c}_1$, which is denoted as $h'_{f_{z_2}}(\tilde{c}_1)$, by using the hash function $h'_{f_{z_2}}$; in a case that the computed hash value $h'_{f_{z_2}}(\tilde{c}_1)$ by the digital asset authentication center is equal to the hash value $h_{f_{z_2}}(\tilde{c}_1)$ obtained through decryption, the authentication succeeds, the digital asset server storing the hash value $h_{f_{z_2}}(\tilde{c}_1)$, that being $\bar{c}_1$; otherwise, the authentication fails, returning and authenticating again; or, approach 6: 1) sharing a string of n-bit random number $z_1$ and performing pre-generation of an irreducible polynomial f(x) by the digital asset server and the digital asset authentication center;

2) sharing secret keys $z_2$ and j between the digital asset server and the digital asset authentication center; using the secret key $z_2$ of the digital asset server as an input random number, together with the pre-generated irreducible polynomial f(x) to obtain a hash function $h_{f_{z_2}}$ based on a linear feedback shift register; computing a hash value of $\tilde{c}_1$, which is denoted as $h_{f_{z_2}}(\tilde{c}_1)$, using the hash function $h_{f_{z_2}}$;

3) encrypting the hash value $h_{f_{z_2}}(\tilde{c}_1)$ using the secret key j of the digital asset server, and sending an encrypted hash value $h_{f_{z_2}}(\tilde{c}_1) \oplus j$ and $\tilde{c}_1$ from the digital asset server to the digital asset authentication center; performing decryption of a received result using the shared secret key j to obtain $h_{f_{z_2}}(\tilde{c}_1)$ by the digital asset authentication center; subsequently, obtaining a hash function $h'_{f_{z_2}}$ based on a linear feedback shift register by the digital asset authentication center, using the secret key $z_2$ of the digital asset authentication center as an input random number together with the pre-generated irreducible polynomial p(x); computing a hash value of $\tilde{c}_1$, which is denoted a $sh'_{f_{z_2}}(\tilde{c}_1)$, using the hash function $h'_{f_{z_2}}$; in a case that the hash value $h'_{f_{z_2}}(\tilde{c}_1)$ is equal to the hash value $h_{f_{z_2}}(\tilde{c}_1)$ obtained through decryption, the authentication succeeds; otherwise, the authentication fails, returning and authenticating again.

Beneficial effects of the present disclosure are as follows:

(1) the present disclosure may be used to confirm the ownerships of digital assets and original user identities, raising the security of ownership confirmation to a same level as quantum security. Meanwhile according to the solution of the present disclosure, a digital asset in the Internet of Value may obtain a real-time and unique identity by a successful authorization, and a forward tracing may be performed through the real-time and unique identity of the digital asset, completing the traceability analysis of the digital asset;

(2) the present disclosure ensures the integrity and real-time uniqueness of digital assets being accessed. An identity document processed at a current accessing moment is formed by nesting a unique identity of digital assets from a previous accessing moment with a subsidiary document from the current accessing moment. A hash value obtained by hashing the identity document is the unique identity of digital assets at the current accessing moment. The unique identity therefore represents the integrity of the digital asset;

(3) solution provided by the present disclosure is easy and convenient to implement, and may be generalized to apply to general information security areas such as information authorization in digital network, digital signature, digital currency, blockchains and the like, which is practically meaningful to further promoting the fast development of digital informatization.

DETAILED DESCRIPTION OF THE EMBODIMENTS

The disclosure is further described in detail in conjunction with the drawings and embodiments.

To confirm ownership of a digital asset, to ensure integrity and real-time uniqueness of digital asset information when being utilized, and to ensure that the information may not be mutated, an method for confirming ownership and a method for tracing to a source of digital assets based on hash algorithm are provided by the present disclosure, such that legitimate ownership of digital assets by an original user and the integrity of the digital assets may be protected. Here the digital assets include purely digital assets, digitalized physical assets, legal documents and other digitizable assets, and any combination thereof.

Figure 1:
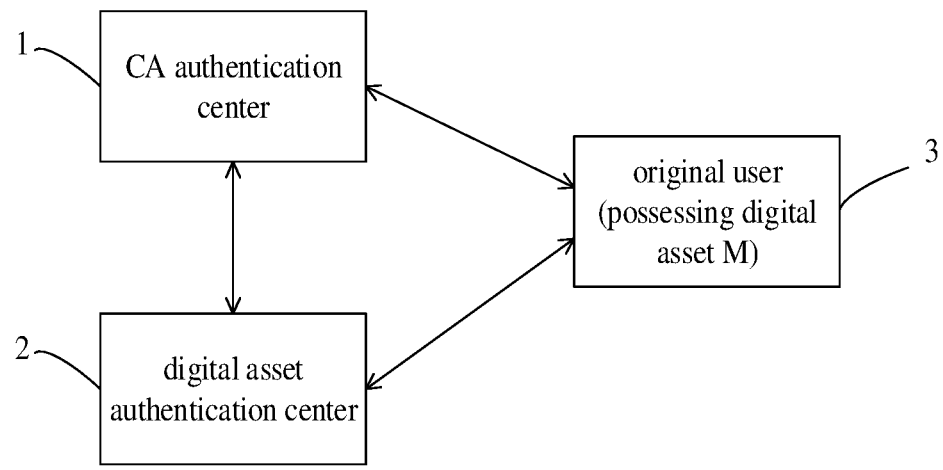
FIG. 1 schematically illustrates entities involved in a method for confirming ownership of digital assets.

Assume an original user has a binary document in digital format. The binary document is a digital asset M, and entities to confirm ownership of the digital asset M are shown in FIG. 1, which include a Certificate Authority (CA) authentication center 1, a digital asset authentication center 2, and an original user 3 possessing the digital asset M. Steps of confirming the ownership of the digital asset are as follows.

(1) The CA authentication center 1 issues a CA user certificate to the original user 3 and generates a service serial number o1. The CA authentication center 1 authenticates a private CA user certificate $CA_2$ of the CA user certificate with the original user 3. After the authentication succeeds, the CA authentication center 1 and the original user 3 each generate a one-time CA certificate otCA.

The CA authentication center 1 is a CA authentication center disclosed in "Digital certificate generation, identity authentication method and quantum CA authentication center and system" with a Chinese patent application number of 2022101851462, and adopts the method from the above application to issue the CA user certificate to the original user 3. The CA user certificate includes a public CA user certificate $CA_1$ and a private CA user certificate $CA_2$, where the public CA user certificate $CA_1$ is generated according to authentic identity information provided by a user, which may include, for example, information that may be displayable to the public such as a user name or a workplace name (and a domain name thereof if it is a network service operator), a certificate serial number (needs to be unique on the entire web), a certificate issuing institution and a domain name or an IP address thereof, and a validity period of the certificate. The private CA user certificate $CA_2$ is included of the public CA user certificate $CA_1$, a timestamp timestamp2 when the CA certificate is generated, and a quantum random number QRN, that is, $$CA_2 = (CA_1, \text{timestamp2}, QRN).$$

Privateness of the private CA user certificate $CA_2$ is ensured by privateness of the quantum random number QRN. In the meantime, the CA authentication center 1 and the original user 3 share the service serial number o1 of the current issuance of the CA user certificate.

Upon completion of issuing, the CA authentication center 1 and the original user 3 both store the CA user certificate $CA_1$ and the private CA user certificate $CA_2$.

The CA authentication center 1 and the original user 3 perform authentication against the private CA user certificate $CA_2$ of the CA user certificate, which specifically includes two approaches as follows.

Approach 1: 1) The CA authentication center 1 obtains and chooses a set of n-bit random number $s_1$ locally. The n-bit random number $s_1$ is used to generate an irreducible polynomial p(x) of order n, and an n-bit character string, formed by coefficients of terms of respective orders except the highest order of the irreducible polynomial, is denoted as str1.

Detailed procedure of generating the irreducible polynomial p(x) using the n-bit random number $s_1$ is as follows.

a) Firstly, the CA authentication center 1 generates a polynomial of order n in the GF(2) domain by successively corresponding respective bits in the n-bit random number $s_1$ to coefficients of terms of respective orders other than a highest order of the polynomial, where a coefficient of the highest order is 1. For example, when a random number of n-bit is $(a_{n-1}, a_{n-2}, \ldots, a_1, a_0)$, a polynomial $p(x)=x^n+a_{n-1}x^{n-1}+ \ldots +a_1x+a_0$ is generated. Preferably, only when $a_0=1$ may a generated polynomial be an irreducible polynomial. Therefore, to reduce computation workload of verifying the irreducible polynomial at a later stage, determination of the random number may be first conducted: in the case that the last bit of the random number is 0, then let the last bit of the random number to be 1; or, in the case that the last bit of the random number is 0, then re-generate a random number until the last bit of the generated random number is 1. This may reduce the computation workload of verifying the irreducible polynomial at a later stage, eventually yielding $a_0=1$, and the generated polynomial to be $p(x)=x^n+a_{n-1}x^{n-1}+ \ldots +a_1x+1$.

b) Furthermore, whether the polynomial is an irreducible polynomial is verified. If a verification result is "no", the CA authentication center 1 re-generates another set of random number. With this newly generated random number, the CA authentication center 1 return to step a) to re-generate the polynomial and to verify; If the verification result is "yes", the verification is stopped and the CA authentication center 1 obtains the irreducible polynomial p(x).

There are multiple ways that may use to verify the irreducible polynomial. Preferably two ways are presented in the present disclosure.

Way A: verify in turn whether gcd $(p(x), x^{2^i}-x)=1$ is true, wherein $$i = 1, 2, \ldots, \left[\frac{n}{2}\right], \text{ and } \left[\frac{n}{2}\right]$$

means rounding of $$\frac{n}{2}.$$

If verifications for all values of i are successful, it means that p(x) is an irreducible polynomial of order n on GF(2) domain; gcd(f(x),g(x)) represents a greatest common factor of f(x) and g(x) on GF(2) domain, where f(x) and g(x) are two arbitrary polynomials.

Way B: verify whether condition (1) $x_2n=x \mod p(x)$ and condition (2) gcd $(p(x), x^{2^{n/d}}-x)=1$ are both true at the same time, where $x^2=x \mod p(x)$ indicates a remainder of $x_2 \mod p(x)$ and a remainder of x mod p(x) are identical, d is an arbitrary prime factor of n, gcd(f(x),g(x)) represents a greatest common factor of f(x) and g(x) on GF(2) domain, where f(x) and g(x) are two arbitrary polynomials. When the two verification conditions are both satisfied at the same time, p(x) is an irreducible polynomial of order n on GF(2) domain.

Generally, the CA authentication center 1 may take $n=2^k$, therefore only d=2 needs to be taken in condition (2). Optionally, the CA authentication center 1 may take $n=2^7=128$. Because this way only needs to verify the two conditions, Fast Modular Composition (FMC) algorithm is adopted to obtain $x^{2^n} \mod p(x)$ and $x^{2^{n/2}} \mod p(x)$ quickly. The CA authentication center 1 replaces $x^{2^{n/d}}$ in condition (2) with $x^{2^{n/2}} \mod p(x)$ for computation. This obtains a computation result faster by lowering the order.

2) The CA authentication center 1 and the original user 3 share two sets of quantum secret keys $s_2$ and v. The length of $s_2$ is n and the length of v is 2n, and the two secret keys are respectively used as an input random number for a hash function and used for encryption for the hash function.

3) The CA authentication center 1 chooses the irreducible polynomial p(x) of order n and the shared secret key $s_2$ which is used as an input random number, to obtain a hash function $h_{p,s_2}$ based on a linear feedback shift register, and uses the hash function to compute a hash value of the private CA user certificate $CA_2$, which is denoted as $h_{p,s_2}(CA_2)$. Then the CA authentication center 1 encrypts the hash value and the character string str1 by using the shared secret key v, and the encryption is performed using an XOR operation to obtain an encryption result $v\alpha(h_{p,s_2}(CA_2),str1)$.

4) The CA authentication center 1 sends the encryption result $v \oplus (h_{p,s_2}(CA_2),str1)$ to the original user 3. After the original user 3 receives the encryption result, the original user 3 decrypts the encryption result using the shared secret key v, to obtain the hash value $h_{p,s_2}(CA_2)$ and the character string str1. The original user 3 generates an irreducible polynomial p'(x) of order n on the GF(2) domain, where a coefficient of a highest order of term of the polynomial is 1, and coefficients of terms other than the highest order of term successively correspond to respective bits in the character string str1. The original user 3 further chooses the irreducible polynomial p'(x) and the shared secret key string $s_2$ as an input random number, to generate a hash function $h'_{p,s_2}$ based on a linear feedback shift register, and uses the hash function $h'_{p,s_2}$ to compute a hash value of the private CA user certificate $CA_2$, which is denoted as $h'_{p,s_2}(CA_2)$. If the computed hash value $h'_{p,s_2}(CA_2)$ by the original user 3 is equal to the hash value $h_{p,s_2}(CA_2)$ obtained through decryption, the authentication succeeds; otherwise, the authentication fails, and it is needed to return and re-issue the CA user certificate.

Approach 2: 1) The CA authentication center 1 and the original user 3 share a string of n-bit random number $s_1$ and perform pre-generation of an irreducible polynomial p(x).

Detailed procedure to pre-generate the irreducible polynomial p(x) is as follows.

a) Firstly, the CA authentication center 1 and the original user 3 each generates a polynomial of order n in the GF(2) domain by successively corresponding respective bits in the n-bit random number to coefficients of terms of respective orders other than a highest order of the polynomial, where a coefficient of the highest order is 1. For example, when a random number of n-bit is $(a_{n-1}, a_{n-2}, \ldots, a_1, a_0)$, a polynomial $p(x)=x^n+a_{n-1}x^{n-1}+ \ldots +a_1x+a_0$ is generated. Preferably, only when $a_0=1$ may a generated polynomial be an irreducible polynomial. Therefore, to reduce computation workload of verifying the irreducible polynomial at a later stage, determination of the random number may be first conducted: in the case that the last bit of the random number is 0, then let the last bit of the random number to be 1; or, in the case that the last bit of the random number is 0, then re-generate the random number until the last bit of the generated random number is 1. This may reduce the computation workload of verifying the irreducible polynomial at a later stage, eventually yielding $a_0=1$, and the generated polynomial to be $p(x)=x^n+a_{n-1}x^{n-1}+\ldots+a_1x+1$.

b) Furthermore, whether the polynomial is an irreducible polynomial is verified. If a verification result is "no", the CA authentication center 1 and the original user 3 share another set of random number which is re-generated. With this newly generated random number, the CA authentication center 1 and the original user 3 return to step a) to re-generate the polynomial and to verify; If the verification result is "yes", the verification is stopped and the CA authentication center 1 and the original user 3 obtain the respective irreducible polynomial.

There are multiple ways that may be used to verify the irreducible polynomial. Preferably two ways are presented in the present disclosure:

Way A: verify in turn whether $gcd(p(x), x^{2^i}-x)=1$ is true, wherein $$i = 1, 2, \ldots, \left[\frac{n}{2}\right], \text{ and } \left[\frac{n}{2}\right]$$

means rounding of $$\frac{n}{2}.$$

If verifications for all values of i are successful, it means that p(x) is an irreducible polynomial of order n on GF(2) domain; gcd(f(x),g(x)) represents a greatest common factor of f(x) and g(x) on GF(2) domain, where f(x) and g(x) are two arbitrary polynomials.

Way B: verify whether condition $x^{2^n}=x \mod p(x)$ and condition (2) $gcd(p(x), x^{2^{n/d}}-x)=1$ are both true at the same time, where $x^{2^n}=x \mod p(x)$ indicates a remainder of $x^{2^n} \mod p(x)$ and a remainder of $x \mod p(x)$ are identical, d is an arbitrary prime factor of n, gcd(f(x),g(x)) represents a greatest common factor of f(x) and g(x) on GF(2) domain, where f(x) and g(x) are two arbitrary polynomials. When the two verification conditions are both satisfied at the same time, p(x) is an irreducible polynomial of order n on GF(2) domain.

Generally, the CA authentication center 1 and the original user 3 may take $n=2^k$, therefore only d=2 needs to be taken in condition (2). Optionally, the CA authentication center 1 and the original user 3 may take $n=2^{7=128}$. Because this way only needs to verify the two conditions, Fast Modular Composition (FMC) algorithm is adopted to obtain $x^{2^n} \mod p(x)$ and $x^{2^{n/2}} \mod p(x)$ quickly. the CA authentication center 1 and the original user 3 replace $x^{2^{n/d}}$ in condition (2) with $x^{2^{n/2}} \mod p(x)$ to perform computation. This obtains a computation result faster by lowering the order.

2) The CA authentication center 1 and the original user 3 share secret keys $s_2$ and v. The CA authentication center 1 uses its own secret key $s_2$, serving as an input random number, together with the pre-generated irreducible polynomial p(x) to generate a hash function $h_{p,s_2}$ based on a linear feedback shift register, then uses the hash function to compute a hash value of the private CA user certificate $CA_2$, which is denoted as $h_{p,s_2}(CA_2)$.

3) The CA authentication center 1 encrypts the hash value $h_{p,s_2}(CA_2)$ using its own secret key v, and sends an encrypted hash value $h_{p,s_2}(CA_2) \oplus v$ to the original user 3. The original user 3 performs decryption of a received result using the shared secret key v to obtain $h_{p,s_2}(CA_2)$. Subsequently, the original user 3 uses its own secret key $s_2$, serving as an input random number, together with the pre-generated irreducible polynomial p(x) to obtain a hash function $h'_{p,s_2}$ based on a linear feedback shift register, uses the hash function $h'_{p,s_2}$ to compute a hash value of the private CA user certificate $CA_2$, which is denoted as $h'_{p,s_2}(CA_2)$. If the hash value $h'_{p,s_2}(CA_2)$ is equal to the hash value $h_{p,s_2}(CA_2)$ obtained through decryption, the authentication succeeds; otherwise, the authentication fails, and it is needed to return and re-issue the CA user certificate.

After the private CA user certificate $CA_2$ is verified, the CA authentication center 1 and the original user 3 each generate a one-time CA certificate otCA. Detailed procedure is as follows.

Firstly, after the private CA user certificate $CA_2$ is verified, the CA authentication center 1 and the original user 3 share an encryption secret key R. Both the CA authentication center 1 and the original user 3 use the encryption secret key R to encrypt $h_{p,s_2}(CA_2)$ during the process of verification to obtain an encryption value $h_{p,s_2}(CA_2) \oplus R$.

Then, the CA authentication center 1 and the original user 3 each generate a one-time CA certificate otCA using the encryption value $h_{p,s_2}(CA_2) \oplus R$, the service serial number o1 of issuance of the CA user certificate and institution information ca of the CA authentication center, that is:

$$otCA=(h_{p,s_2}(CA_2) \oplus R, o1, ca)$$

An expiration date of the one-time CA certificate otCA may be set, meaning that the one-time CA certificate otCA expires when the expiration date is exceeded.

(2) The original user 3 sends the digital asset M to the digital asset authentication center 2 and meanwhile generates a service serial number o2. The digital asset authentication center 2 performs authentication on the digital asset M with the original user 3, and after the authentication is successful, the digital asset authentication center 2 and the original user 3 each generate an authentication document of the digital asset M.

Authentication of the digital asset M by the digital asset authentication center 2 and the original user 3 specifically includes two approaches which are respectively shown as follows.

Approach 3: 1) The digital asset authentication center 2 obtains and chooses a set of n-bit random number $k_1$ locally. The n-bit random number $k_1$ is used to generate an irreducible polynomial q(x) of order n, and an n-bit character string, formed by coefficients of terms of respective orders in addition to a highest order of the irreducible polynomial, is denoted as str2. The generation of the irreducible polynomial q(x) of order n is identical to the generation of the irreducible polynomial in Approach 1, and thus description of which is not to be repeated.

2) The digital asset authentication center 2 and the original user 3 share two sets of quantum secret keys $k_2$ and u. The length of $k_2$ is n and the length of u is 2n, and the two secret keys are respectively used as an input random number for a hash function and used for encryption for the hash function.

3) The digital asset authentication center 2 chooses the irreducible polynomial q(x) of order n and the shared secret key $k_2$ which is used as an input random number, to obtain a hash function $h_{q,k_2}$ based on a linear feedback shift register, and uses the hash function to compute a hash value of the digital asset M, which is denoted as $h_{q,k_2}(M)$. Then the digital asset authentication center 2 encrypts the hash value and the character string str2 by using the shared secret key u, and the encryption is performed using an XOR operation to obtain an encryption result $u \oplus (h_{q,k_2}(M), str2)$.

4) The digital asset authentication center 2 sends the encryption result $u \oplus (h_{q,k_2}(M), str2)$ to the original user 3. After the original user 3 receives the encryption result, the original user 3 decrypts the encryption result using the shared secret key u, to obtain the hash value $h_{q,k_2}(M)$ and the character string str2. The original user 3 generates an irreducible polynomial q'(x) of order n on the GF(2) domain, where a coefficient of a highest order of term of the polynomial is 1, and coefficients of terms other than the highest order of term successively correspond to respective bits of the character string str2. The irreducible polynomial q'(x) is further chosen along with the shared secret key string $t_2$, which is used as an input random number, to generate a hash function $h'_{q,k_2}$ based on a linear feedback shift register, and uses the hash function $h'_{q,k_2}$ to compute a hash value of the digital asset M, which is denoted as $h'_{q,k_2}(M)$. If the computed hash value $h'_{q,k_2}(M)$ by the original user 3 is equal to the hash value $h_{q,k_2}(M)$ obtained through decryption, the authentication succeeds; otherwise, the authentication fails, and it is needed to return and authenticate again.

Or, Approach 4: 1) the digital asset authentication center 2 and the original user 3 share a string of n-bit random number $k_1$ and perform pre-generation of an irreducible polynomial q(x). Pre-generation of the irreducible polynomial q(x) of order n is identical to pre-generation of the irreducible polynomial in Approach 2, and thus description of which is not to be repeated.

2) The digital asset authentication center 2 and the original user 3 share secret keys $k_2$ and u. The digital asset authentication center 2 uses its own secret key $k_2$, serving as an input random number, together with the pre-generated irreducible polynomial q(x) to obtain a hash function $h_{q,k_2}$ based on a linear feedback shift register, then uses the hash function to compute a hash value of the digital asset M, which is denoted as $h_{q,k_2}(M)$.

3) The digital asset authentication center 2 encrypts the hash value $h_{q,k_2}(M)$ using its own secret key u, and sends an encrypted hash value $h_{q,k_2}(M) \oplus u$ to the original user 3. The original user 3 performs decryption of a received result using the shared secret key u to obtain $h_{q,k_2}(M)$. Subsequently, the original user 3 uses its own secret key $k_2$, serving as an input random number, together with the pre-generated irreducible polynomial to generate a hash function $h'_{q,k_2}$ based on a linear feedback shift register, and uses the hash function $h'_{q,k_2}$ to compute a hash value of the digital asset M, which is denoted as $h'_{q,k_2}(M)$. If the hash value $h'_{q,k_2}(M)$ is equal to the hash value $h_{q,k_2}(M)$ obtained through decryption, authentication succeeds; otherwise, authentication fails, and it is needed to return and authenticate again.

Authentication of the digital asset M is performed and after the authentication is successful, the digital asset M and the original user 3 each generates an authentication document of the digital asset M. Detailed procedure is as follows.

After the authentication of the digital M is successful, each of the digital asset authentication center 2 and the original user 3 uses the hash value $h_{q,k_2}(M)$, the service serial number o2 of sending the digital asset M and institution information da of the digital asset authentication center, to generate an authentication document $H_M$ of the digital asset M, that is:

$$H_M = (h_{q,k_2}(M), o2, da)$$

Figure 2:
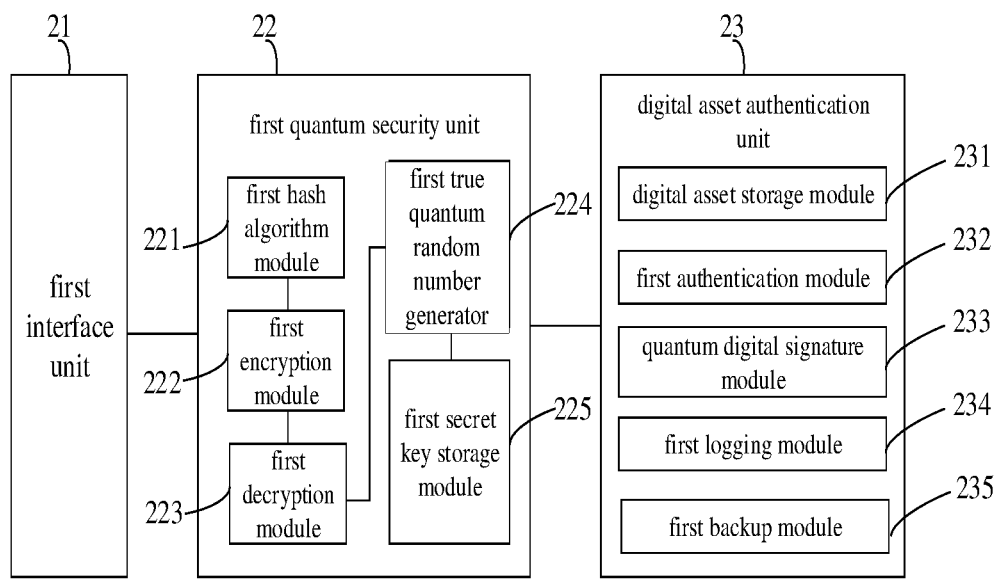
FIG. 2 schematically illustrates a structure of a digital asset authentication center.

Structure of the digital asset authentication center 2 is shown in FIG. 2, which includes a first interface unit 21, a first quantum security unit 22 connected to the first interface unit 21, and a digital asset authentication unit 23 connected to the first quantum security unit 22.

The first interface unit 21 is configured to allow connection and communication interaction between the digital asset authentication center 2 and other exterior systems, for example, allowing authentication of the digital asset M with the original user 3.

The first quantum security unit 22 includes a first hash algorithm module 221, a first encryption module 222, a first decryption module 223, a first true quantum random number generator 224 and a first secret key storage module 225 which are sequentially connected. The first hash algorithm module 221 is configured to generate a hash function to perform hash computation of information. The first encryption module 222 is configured to perform encryption operation. The first decryption module 223 is configured to perform decryption operation. The first true quantum random number generator 224 is configured to generate true quantum random numbers. The first secret key storage module 225 is configured to store secret keys.

The digital asset authentication unit 23 includes a digital asset storage module 231, a first authentication module 232, a quantum digital signature module 223, a first logging module 234 and a first backup module 235 which are sequentially connected. The digital asset storage module 231 is configured to store documents. The first authentication module 232 is configured to perform authentication operations. The quantum digital signature module 223 is configured to perform quantum digital signing operation for generated signature documents. The first logging module 234 is configured to record a signature verification result of a quantum digital signature and a result of authentication. In order to prevent the digital asset authentication center 2 from data loss, the first backup module 235 is configured to back up recorded data of the first logging module 234.

(3) The original user 3 generates a service serial number o3 of quantum digital signature and generates a signature document $doc_M$. The CA authentication center 1, the digital asset authentication center 2 and the original user 3 conduct a three-party quantum digital signature for the signature document $doc_M$, where the original user 3 is a signing party, the CA authentication center 1 and the digital asset authentication center 2 are signature verification parties. When the signature is successfully verified by both the CA authentication center 1 and the digital asset authentication center 2, the CA authentication center 1 conducts an identity verification and the digital asset verification center 2 conducts a document verification. When both the identity verification and the document verification are successful, ownership confirmation of the digital asset succeeds while producing a service serial number o4 and entering next step. Otherwise, verification of the signature fails, a current ownership confirmation of the digital asset is terminated, or a new ownership confirmation is initiated.

Firstly, the specific procedure to generate the signature document $doc_M$ by the original user 3 may be as follows.

The authentication document $H_M$ of the digital asset M, the one-time CA certification otCA, the service serial number o3 of quantum digital signature, the institution information ca of the CA authentication center 1 and the institution information da of the digital asset authentication center 2 are used to generate the signature document $doc_M$ by the original user 3, that is:

$$doc_M = (H_M, otCA, o3, ca, da)$$

The CA authentication center 1, the digital asset authentication center 2 and the original user 3 conduct a three-party quantum digital signature for the signature document $doc_M$, where the original user 3 is a signing party, the CA authentication center 1 and the digital asset authentication center 2 each is a signature verification party. When the signature is successfully verified by both the CA authentication center 1 and the digital asset authentication center 2, the CA authentication center 1 conducts an identity verification and the digital asset verification center 2 conducts a document verification, of which the specific procedure is as follows.

S1. The original user 3 obtains a random number locally to generate an irreducible polynomial l(x), and a character string, formed by coefficients of terms of respective orders except the highest order of the irreducible polynomial l(x), is denoted as str3. The method for generating the irreducible polynomial l(x) of order n is identical to the method for generating the irreducible polynomial in Method 1, and thus description of which is not to be repeated.

S2. A secret key negotiation is performed between the original user 3 and the CA authentication center 1, and a shared secret key $x_1$ and a shared secret key $y_1$ are obtained respectively. A secret key negotiation is performed between the original user 3 and the digital asset authentication center 2, and a shared secret key $x_2$ and a shared secret key $y_2$ are obtained respectively. The length of $x_1$ is identical to the length of $x_2$, the length of $y_1$ is identical to the length of $y_2$, and the length of $y_1$ is twice as long as the length of $x_1$. The original user 3 performs XOR operation on the secret keys $x_1$, $y_1$, $x_2$ and $y_2$, to obtain secret keys $x_3$ and $y_3$ as follows:

$$x_3 = x_1 \oplus x_2$$

$$y_3 = y_1 \oplus y_2$$

S3. The irreducible polynomial l(x) and the secret key $x_3$ used as an input random number are chosen to generate a hash function $h_{l,x_3}$ by the original user 3. A hash operation is performed by the original user 3 on the signature document $doc_M$ using the hash function $h_{l,x_3}$ to obtain a hash value $h_{l,x_3}(doc_M)$. The hash value $h_{l,x_3}(doc_M)$ and the character string str3 are encrypted using the secret key $y_3$ by the original user 3. The encryption is performed using an XOR operation, and an encrypted value $(h_{l,x_3}(doc_M), str3) \oplus y_3$ and the signature document $doc_M$ are transmitted to the CA authentication center 1.

S4. After receiving $(h_{l,x_3}(doc_M), str3) \oplus y_3$ and the signature document $doc_M$ by the CA authentication center 1, the CA authentication center 1 sends its own secret keys $x_1$ and $y_1$, $(h_{l,x_3}(doc_M), str3) \oplus y_3$ and the signature document $doc_M$ to the digital asset authentication center 2. The digital asset authentication center 2, upon reception of the secret keys and the signature document, sends its own secret keys $x_2$ and $y_2$ to the CA authentication center 1. An exchange of information of the two parties takes place over an authenticated channel to prevent information tampering. At this time, the CA authentication center 1 and the digital asset authentication center 2 both possess the secret keys $x_1$, $y_1$, $x_2$, $y_2$, $(h_{l,x_3}(doc_M), str3) \oplus y_3$ and the signature document $doc_M$.

S5. After the exchange of information is completed, an XOR operation on the secret keys $x_1$, $y_1$, $x_2$, $y_2$ owned by the CA authentication center 1 is performed by the CA authentication center 1 to obtain secret keys $x_3'$ and $y_3'$, where:

$$x_3' = x_1 \oplus x_2$$

$$y_3' = y_1 \oplus y_2;$$

The encrypted value $(h_{l,x_3}(doc_M), str3) \oplus y_3$ is decrypted using the secret key $y_3'$ by the CA authentication center 1 to obtain $h_{l,x_3}(doc_M)$ and the character string str3. Then the CA authentication center 1 generates an irreducible polynomial l'(x) by successively corresponding respective bits in the character string str3 to coefficients of terms of respective orders other than a highest order of the polynomial, where a coefficient of the highest order is 1. The irreducible polynomial l'(x) and the secret key $x_3'$ used as an input random number are chosen by the CA authentication center 1 to generate a hash function $h_{l',x_3'}$. A hash operation is performed by the CA authentication center 1 using the hash function $h_{l',x_3'}$ on the signature document $doc_M$ to obtain a hash value $h_{l',x_3'}(doc_M)$. The computed hash value $h_{l',x_3'}(doc_M)$ and the decrypted $h_{l,x_3}(doc_M)$ are compared by the CA authentication center 1. If they are equal, then a signature verification succeeds, otherwise a signature verification fails.

S6. The digital asset authentication center 2 adopts the same way to verify signature as the CA authentication center 1.

S7. When the signature is successfully verified by both the CA authentication center 1 and the digital asset authentication center 2, the CA authentication center 1 conducts an identity verification and the digital asset verification center 2 conducts a document verification. The specific procedure is: the CA authentication center 1 compares the otCA in the signature document $doc_M$ with the otCA generated by the CA authentication center 1 to observe their consistency, if they are consistent, an identity verification is successful; the digital asset authentication center 2 compares the $H_M$ in the signature document $doc_M$ with the $H_M$ generated by the digital asset authentication center 2 to observe their consistency, if they are consistent, a document verification is successful. When the signature verification, the identity verification and the document verification are all successful, ownership confirmation of the digital asset succeeds while producing a service serial number o4 and entering next step. Otherwise, a current ownership confirmation of the digital asset fails, and the ownership confirmation of the digital asset is terminated or a new ownership confirmation is initiated.

(4) An ownership confirmation document of the digital asset M is generated by the original user 3. The specific procedure may be as follows.

Firstly, a timestamp corresponds to a successful ownership confirmation operation of the digital asset is recorded as timestamp1 by the original user 3. Next, the hash value $h_{l,x_3}(doc_M)$ of the signature document, the signature document $doc_M$, the timestamp timestamp1, and the service serial number o4 are used by the original user 3 to generate an ownership confirmation document $\overline{M}$ of the digital asset M:

$$\overline{M} = (h_{l,x_3}(doc_M), doc_M, \text{timestamp1}, o4)$$

Where, the hash value $h_{l,x_3}(doc_M)$ represents the integrity of the signature document $doc_M$. This integrity binds the relationship between the identity of the original user 3 (i.e., the one-time CA certificate otCA) and the digital asset M (i.e., the authentication document $H_M$), and the hash value $h_{q,k_2}(M)$ of the digital asset M indicates the integrity of the digital asset M. The resulting ownership confirmation document $\overline{M}$ is a digital identity of the digital asset M in the present disclosure, which maintains an inseparable relationship with the digital asset M, may be the basis for confirming ownership of the digital asset M and has a highest known security level.

Figure 3:
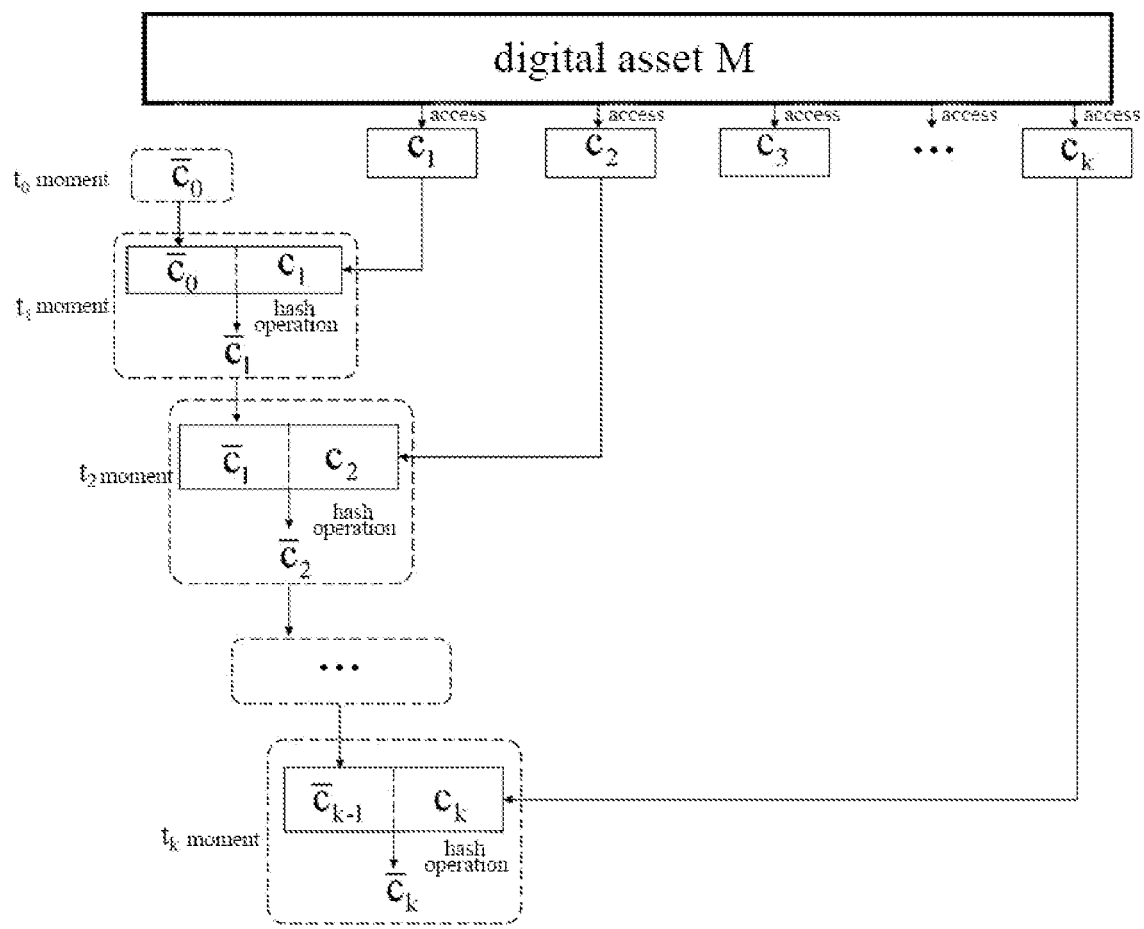
FIG. 3 schematically illustrates processes of constructing a unique identity of a digital asset at an accessing moment.

After successful ownership confirmation of the digital asset M, the digital asset M of the original user 3 may be accessed multiple times. In order to achieve the traceability of accessing the digital asset M, as shown in FIG. 3, a method for tracing to a source of digital assets based on hash algorithm is further provided by the present disclosure, which includes the following steps.

(1) An initial access moment: the above-mentioned method for confirming ownership is used by the original user 3 to confirm an ownership of the digital asset M. After the confirmation is successful, the ownership confirmation document is obtained, which is a unique identity of the digital asset at the initial access moment, and the digital asset M along with the ownership confirmation document are uploaded to a digital asset server.

(2) An access moment: when an access user accesses the digital asset M on the digital asset server, the digital asset server generates a subsidiary document in real time. The subsidiary document includes but is not limited to a timestamp and identity information of the access user. The specific procedure for generating the subsidiary document in real time may be as follows.

The initial access moment when an ownership of the digital asset M is confirmed and the digital asset M is uploaded to the digital asset server is denoted as moment $t_0$.

1) When the access user accesses the digital asset M at a moment $t_1$, the digital asset server generates a subsidiary document $c_1$ with a length of $n_1$ in real time. The subsidiary document $c_1$ includes but is not limited to the timestamp $t_1$ and related information of the access user such as the identity information of the access user.

2) When the access user accesses the digital asset M at a moment $t_2$, the digital asset server generates a subsidiary document $c_2$ with a length of $n_2$ in real time. The subsidiary document $c_2$ includes but is not limited to the timestamp $t_2$ and related information of the access user such as the identity information of the access user.

3) In a similar manner, when the access user accesses the digital asset M at a moment $t_k$, the digital asset server generates a subsidiary document $c_k$ with a length of $n_k$ in real time. The subsidiary document $c_k$ includes but is not limited to the timestamp $t_k$ and related information of the access user such as the identity information of the access user. After undergoing the above-mentioned procedure, a subsidiary document is generated correspondingly every time the digital asset M is accessed.

The digital asset M is replicable, and may be replicated on different servers, denoted as M'. Subsidiary documents are generated on other servers in the same manner as previously mentioned.

(3) A unique identity of the digital asset at the access moment is constructed: an authentication of an identity document is conducted by the digital asset server and the digital asset authentication center 2 and a hash value of the identity document is obtained, which is a unique identity of the digital asset at a current access moment; where the identity document is formed by nesting a unique identity of the digital asset of a previous access moment and a subsidiary document of the current access moment. The specific process is as follows.

At moment $t_0$, ownership of the digital asset M is confirmed to obtain an ownership confirmation document $\overline{c_0}$ of the digital asset M. $\overline{c_0}$ is a unique identity of the digital asset accessed at moment $t_0$. The ownership confirmation document $\overline{c_0}$ obtained at moment to is the above-mentioned ownership confirmation document $\overline{M}$ of the digital asset M, that is $\overline{c_0}=\overline{M}$.

At moment $t_1$, the unique identity $\overline{c_0}$ of the digital asset M accessed at access moment $t_0$ and the subsidiary document $c_1$ of length $n_1$ generated in real time by accessing the digital asset M by the access user at moment $t_1$, are nested to form an identity document $\tilde{c}_1=(\overline{c_0}, c_1)$. The identity document $\tilde{c}_1$ is authenticated by the digital asset server and the digital asset authentication center 2. A hash value $\overline{c_1}$ of the identity document $\tilde{c}_1$ is obtained after authentication, and the hash value $\overline{c_1}$ is a unique identity of the digital asset accessed at moment $t_1$.

Authenticating the identity document $\tilde{c}_1$ and obtaining the hash value $\overline{c_1}$ of the identity document $\tilde{c}_1$ after authentication may include two approaches respectively as follows.

Approach 5: 1) The digital asset server obtains and chooses a set of n-bit random number $z_1$ locally. The n-bit random number $z_1$ is used to generate an irreducible polynomial f(x) of order n, and an n-bit character string, formed by coefficients of terms of respective orders except the highest order of the irreducible polynomial, is denoted as str4. Generation of the irreducible polynomial f(x) of order n is identical to generation of the irreducible polynomial in Approach 1, and thus description of which is not to be repeated.

2) The digital asset server and the digital asset authentication center 2 share two sets of quantum secret keys $z_2$ and j. The length of $z_2$ is n and the length of j is 2n, and the two secret keys are respectively used as an input random number for a hash function and used for encryption for the hash function.

3) The digital asset server chooses the irreducible polynomial f(x) of order n and the shared secret key $z_2$ which is used as an input random number, to obtain a hash function $h_{f_{z_2}}$ based on a linear feedback shift register, and uses the hash function to compute a hash value of $\tilde{c}_1$, which is denoted as $h_{f_{z_2}}(\tilde{c}_1)$. The hash value and the character string str4 are encrypted by the digital asset server using the shared secret key j, and the encryption is performed using an XOR operation to obtain an encryption result $j \oplus (h_{f_{z_2}}(\tilde{c}_1), str4)$.

4) The digital asset server sends the encryption result $j \oplus (h_{f_{z_2}}(\tilde{c}_1), str4)$ to the digital asset authentication center 2. After the digital asset authentication center 2 receives the encryption result, the digital asset authentication center 2 decrypts the encryption result using the shared secret key j, obtaining the hash value $h_{f_{z_2}}(\tilde{c}_1)$ and the character string str4. The digital asset authentication center 2 generates a polynomial f'(x) of order n in the GF(2) domain by successively corresponding respective bits in the character string str4 to coefficients of terms of respective orders other than a highest order of the polynomial, where a coefficient of the highest order is 1. The digital asset authentication center 2 further chooses the irreducible polynomial f'(x) and the shared secret key string $z_2$ which is used as an input random number, to generate a hash function $h'_{f_{z_2}}$ based on a linear feedback shift register. The hash function $h'_{f_{z_2}}$ is used to compute a hash value, which is denoted as $h'_{f_{z_2}}(\tilde{c}_1)$, of $\tilde{c}_1$. If the computed hash value $h'_{f_{z_2}}(\tilde{c}_1)$ by the digital asset authentication center 2 is equal to the hash value $h_{f_{z_2}}(\tilde{c}_1)$ obtained through decryption, the authentication is successful and the digital asset server stores the hash value $h_{f_{z_2}}(\tilde{c}_1)$, that is $\overline{c_1}$; otherwise, the authentication is unsuccessful, and it is needed to return and perform authentication again.

Or, Approach 6: 1) The digital asset server and the digital asset authentication center 2 share a string of n-bit random number $z_1$ and perform pre-generation of an irreducible polynomial f(x). Pre-generation of the irreducible polynomial f(x) of order n is identical to the method for generating the irreducible polynomial in Approach 2, and thus description of which is not to be repeated.

2) The digital asset server and the digital asset authentication center 2 share secret keys $z_2$ and j. The digital asset server uses its own secret key $z_2$, serving as an input random number, together with the pre-generated irreducible polynomial f(x) to obtain a hash function $h_{f_{z_2}}$ based on a linear feedback shift register, and then uses the hash function $h_{f_{z_2}}$ to compute a hash value of $\tilde{c}_1$, which is denoted as $h_{f_{z_2}}(\tilde{c}_1)$.

3) The digital asset server encrypts the hash value $h_{f_{z_2}}(1)$ using its own secret key j, and sends an encrypted hash value $h_{f_{z_2}}(\tilde{c}_1) \oplus j$ and $\tilde{c}_1$ to the digital asset authentication center 2. The digital asset authentication center 2 performs decryption of a received result using the shared secret key j to obtain $h_{f_{z_2}}(\tilde{c}_1)$. Subsequently, the digital asset authentication center 2 uses its own secret key $z_2$, serving as an input random number, together with the pre-generated irreducible polynomial p(x) to obtain a hash function $h'_{f_{z_2}}$ based on a linear feedback shift register, and uses the hash function $h'_{f_{z_2}}$ to compute a hash value of $\tilde{c}_1$, which is denoted as $h'_{f_{z_2}}(\tilde{c}_1)$. If the hash value $h'_{f_{z_2}}(1)$ is equal to the hash value $h_{f_{z_2}}(1)$ obtained through decryption, the authentication is successful; otherwise, the authentication is unsuccessful, and it is needed to return and authenticate again.

Eventually, the hash value $h_{f_{z_2}}(\tilde{c}_1)$, that is $\overline{c_1}$, is stored, which is the unique identity of the digital asset accessed at moment $t_1$.

3) In a similar manner, at moment $t_k$, a unique identity $\overline{c}_{k-1}$ of the digital asset M accessed at access moment $t_{k-1}$, and a subsidiary document $c_k$ of length $n_k$ generated in real time when the access user accesses the digital asset M at moment $t_k$, are nested to form an identity document $\tilde{c}_k = (\overline{c}_{k-1}, c_k)$. The identity document $\tilde{c}_k = (\tilde{c}_{k-1}, c_k)$ is authenticated by the digital asset server and the digital asset authentication center 2 using the same approach used to authenticate the identity document $\tilde{c}_1$. A hash value $\overline{c_k}$ of the identity document $\tilde{c}_k$ is obtained after authentication, and the hash value $\overline{c_k}$ is a unique identity of the digital asset accessed at moment $t_k$.

(4) Traceability analysis: the above step (2) and step (3) are repeated multiple times to obtain a unique identity of the digital asset at a final access moment, that is, to obtain the unique identity $\overline{c_k}$ of the digital asset at moment $t_k$. The history of the unique identity of the digital asset at the final access moment is traced, that is to trace the history of the unique identity of the digital asset at moments $t < t_k$. So that the traceability analysis of the digital asset is thus completed.

According to the solution proposed by the present disclosure, the identity document at the current access moment is formed by nesting the unique identity of the digital asset at the previous access moment and the subsidiary document at the current access moment. The identity document at the current access moment is authenticated, and the hash value is obtained by hashing the unique identity of the digital asset at the current access moment, and the unique identity represents the integrity of the digital asset. Meanwhile, the unique identity of digital asset may be traced forward to complete the traceability analysis of the entire life cycle of digital asset.

To satisfy the needs of information theory security or unconditional security, hash function chosen by the present disclosure is preferably a hash function based on a Toeplitz matrix. Nevertheless, there are many alternative hash functions that may be chosen to meet the requirements of the present disclosure, as long as the chosen hash function satisfies four functions which are fast forward, difficult backward, sensitive input and collision avoidance. The fast forward means that given a plaintext and hash algorithm, a hash value may be obtained under limited time and limited resources quickly. The difficult backward means that given some hash values, a plaintext may be difficult or even impossible to be backward deduced under limited time. The sensitive input means that if there are any changes happened to an original input information, the corresponding hash value should be different. The collision avoidance means that it is very difficult to find two distinct pieces of plaintext that have the same hash value. As it provides a wide range of choices for hash value computation, the implementation of the solution provided by the present disclosure is easy and convenient, which may be widely applied to generalized information security areas such as information authentication on digital network, digital signature, digital currency and blockchain, possessing significant practical meaning to further promote the rapid development of digital informatization.

What is claimed is:

1. A method for confirming ownership of digital assets based on a hash algorithm, comprising:
   (1) issuing a CA user certificate to an original user and generating a service serial number o1 by a CA authentication center; authenticating a private CA user certificate $CA_2$ of the CA user certificate with the original user by the CA authentication center; after the authentication is successful, generating a one-time CA certificate otCA by each of the CA authentication center and the original user;
   (2) sending a digital asset M to a digital asset authentication center and meanwhile generating a service serial number o2 by the original user; performing authentication on the digital asset M with the original user by the digital asset authentication center, and after the authentication is successful, generating an authentication document of the digital asset M by each of the digital asset authentication center and the original user;
   (3) generating a service serial number o3 of quantum digital signature and generating a signature document $doc_M$ by the original user; conducting a three-party quantum digital signature for the signature document $doc_M$ by the CA authentication center, the digital asset authentication center and the original user, wherein the original user is a signing party, the CA authentication center and the digital asset authentication center are signature verification parties; after successfully verifying the signature by both the CA authentication center and the digital asset authentication center, conducting an identity verification by the CA authentication center and conducting a document verification by the digital asset verification center; when both the identity verification and the document verification are successful, ownership confirmation of the digital asset is successful while producing a service serial number o4 and entering next step; otherwise, verification of the signature is unsuccessful, a current process of confirming ownership of the digital asset is terminated or a new process of confirming ownership is initiated; and
   (4) generating an ownership confirmation document of the digital asset M by the original user.

2. The method of claim 1, wherein authenticating a private CA user certificate $CA_2$ of the CA user certificate with the original user by the CA authentication center comprises:
   approach 1: 1) obtaining and choosing a set of n-bit true random number $s_1$ locally by the CA authentication center; generating an irreducible polynomial p(x) of order n using the n-bit true random number $s_1$, and denoting the n-bit character string, formed by coefficients of terms of respective orders except the highest order of the irreducible polynomial, as str1;
   2) sharing two sets of quantum secret keys $s_2$ and v by the CA authentication center and the original user; the length of $s_2$ being n and the length of v being 2n, and respectively using the two secret keys as an input random number for a hash function and for encryption for the hash function;

3) obtaining a hash function $h_{p,s_2}$ based on a linear feedback shift register by the CA authentication center from choosing the irreducible polynomial p(x) of order n and the shared secret key $s_2$ as an input random number; then computing a hash value of the private CA user certificate, which is denoted as $h_{p,s_2}(CA_2)$, using the hash function; encrypting the hash value and the character string str1 by using the shared secret key v, and the encryption is performed using an XOR operation to obtain an encryption result $v \oplus (h_{p,s_2}(CA_2),str1)$ by the CA authentication center;

4) sending the encryption result $v \oplus (h_{p,s_2}(CA_2),str1)$ to the original user by the CA authentication center; after receiving the encryption result by the original user, decrypting the encryption result using the shared secret key v by the original user to obtain the hash value $h_{p,s_2}(CA_2)$ and the character string str1; generating an irreducible polynomial p'(x) of order n on the GF(2) domain by successively corresponding respective bits in the character string str1 to coefficients of terms of respective orders other than a highest order of the polynomial, wherein a coefficient of the highest order of term of the polynomial is 1 by the original user; generating a hash function $h'_{p,s_2}$ based on a linear feedback shift register by further choosing the irreducible polynomial p'(x) and the shared secret key string $s_2$ as an input random number by the original user; computing a hash value of the private CA user certificate $CA_2$, which is denoted as $h'_{p,s_2}(CA_2)$, using the hash function $h'_{p,s_2}$; in the case that the computed hash value $h'_{p,s_2}(CA_2)$ by the original user is equal to the hash value $h_{p,s_2}(CA_2)$ obtained through decryption, the authentication is successful; otherwise, the authentication is unsuccessful, returning and re-issuing the CA user certificate to the original user by the CA authentication center; or approach 2: 1) sharing a string of n-bit true random number $s_1$ and performing a pre-generation of an irreducible polynomial p(x) by the CA authentication center and the original user;

2) sharing secret keys $s_2$ and v between the CA authentication center and the original user; generating a hash function $h_{p,s_2}$ based on a linear feedback shift register by the CA authentication center using its own secret key $s_2$, serving as an input random number together with the pre-generated irreducible polynomial p(x); then computing a hash value of the private CA user certificate $CA_2$, which is denoted as $h_{p,s_2}(CA_2)$, using the hash function;

3) encrypting the hash value $h_{p,s_2}(CA_2)$ using the secret key v of the CA authentication center, and sending an encrypted hash value $h_{p,s_2}(CA_2) \oplus v$ to the original user from the CA authentication center; performing decryption of the received result using the shared secret key v to obtain $h_{p,s_2}(CA_2)$ by the original user; subsequently, generating a hash function $h_{p,s_2}$ based on a linear feedback shift register by the original user using its own secret key $s_2$, serving as an input random number together with the pre-generated irreducible polynomial p(x); computing a hash value of the private CA user certificate $CA_2$, which is denoted as $h'_{p,s_2}(CA_2)$, using the hash function $h'_{p,s_2}$; in the case that the hash value $h'_{p,s_2}(CA_2)$ being equal to the hash value $h_{p,s_2}(CA_2)$ obtained through decryption, the authentication is successful; otherwise, the authentication is unsuccessful, returning and re-issuing the CA user certificate to the original user by the CA authentication center.

3. The method of claim 2, wherein generating the irreducible polynomial p(x) of order n using the n-bit true random number $s_1$ comprises:

a) firstly, generating a polynomial of order n in the GF(2) domain by successively corresponding respective bits in the n-bit true random number $s_1$ to coefficients of terms of respective orders other than a highest order of the polynomial, wherein a coefficient of the highest order is 1;

b) furthermore, verifying whether the polynomial is an irreducible polynomial; in the case that a verification result being no, re-generating another set of true random number by the CA authentication center; with this newly generated true random number, returning to step a) to re-generate the polynomial and to verify; if the verification result is yes, stopping the verification and obtaining the irreducible polynomial by the CA authentication center.

4. The method of claim 3, further comprising:
prior to step a), in the case that the last bit of the true random number is 0, then letting the last bit of the true random number to be 1; or, in the case that the last bit of the true random number is 0, then re-generating a true random number until the last bit of the generated true random number is 1.

5. The method of claim 2, wherein performing pre-generation of the irreducible polynomial p(x) comprises:

a) firstly, generating a polynomial of order n in the GF(2) domain by each of the CA authentication center and the original user by successively corresponding respective bits in the n-bit true random number to coefficients of terms of respective orders other than a highest order of the polynomial, wherein a coefficient of the highest order is 1;

b) furthermore, verifying whether the polynomial is an irreducible polynomial; in the case that a verification result is no, sharing another set of re-generated true random number by the CA authentication center with the original user; with this newly generated true random number, return to step a) to re-generate the polynomial and to verify; in the case that the verification result is yes, stopping the verification and obtaining the respective irreducible polynomial by both the CA authentication center and the original user.

6. The method of claim 5, further comprising:
prior to step a), in the case that the last bit of the true random number is 0, then letting the last bit of the true random number to be 1; or, in the case that the last bit of the true random number is 0, then re-generating a true random number until the last bit of the generated true random number is 1.

7. The method of claim 2, wherein generating the one-time CA certificate otCA respectively by the CA authentication center and the original user comprises:
firstly, after verifying the private CA user certificate CA2 by the CA authentication center and the original user, sharing an encryption secret key R between the CA authentication center and the original user; obtaining an encryption value $h_{p,s_2}(CA_2) \oplus R$ by both the CA authentication center and the original user using the encryption secret key R to encrypt $h_{p,s_2}(CA_2)$ which is obtained during the process of verification; then, generating, by each of the CA authentication center and the original user, a one-time CA certificate otCA using the encryption value $h_{p,s_2}(CA_2) \oplus R$, the service serial number o1 of issuance of the CA user certificate and institution information ca of the CA authentication center, that is:

$$otCA = (h_{p,s_2}(CA_2) \oplus R, o1, ca).$$

8. The method of claim 7, wherein performing authentication with the original user by the digital asset authentication center comprises:

approach 3: 1) obtaining and choosing a set of n-bit true random number $k_1$ locally by the digital asset authentication center; generating an irreducible polynomial q(x) of order n using the n-bit true random number $k_1$, and denoting an n-bit character string as str2, which is formed by coefficients of terms of respective orders except the highest order of the irreducible polynomial;

2) sharing two sets of quantum secret keys $k_2$ and u between the digital asset authentication center and the original user; the length of $k_2$ being n and the length of u being 2n, and using the two secret keys respectively as an input random number for a hash function and for encryption of the hash function;

3) obtaining a hash function $h_{q,k_2}$ based on a linear feedback shift register by the digital asset authentication center by choosing the irreducible polynomial q(x) of order n and the shared secret key $k_2$ as an input random number; computing a hash value of the digital asset M, which is denoted as $h_{q,k_2}(M)$, by using the hash function; encrypting, by the digital asset authentication center, the hash value and the character string str2 by using the shared secret key u, and performing the encryption using an XOR operation to obtain an encryption result $u \oplus (h_{q,k_2}(M), str2)$;

4) sending the encryption result $u \oplus (h_{q,k_2}(M), str2)$ to the original user from the digital asset authentication center; after receiving the encryption result by the original user, decrypting, by the original user, the encryption result using the shared secret key u to obtain the hash value $h_{q,k_2}(M)$ and the character string str2; generating, by the original user, an irreducible polynomial q'(x) of order n on the GF(2) domain by successively corresponding respective bits in the character string str2 to coefficients of terms of respective orders other than a highest order of the polynomial, wherein a coefficient of the highest order is 1; generating a hash function $h'_{q,k_2}$ based on a linear feedback shift register by further choosing the irreducible polynomial q'(x) along with the shared secret key string $k_2$ as an input random number; computing a hash value of the digital asset M, which is denoted as $h'_{q,k_2}(M)$, using the hash function $h'_{q,k_2}$; in a case that the computed hash value $h'_{q,k_2}(M)$ by the original user is equal to the hash value $h_{q,k_2}(M)$ obtained through decryption, the authentication succeeds; otherwise, the authentication fails, returning and authenticating again; or approach 4: 1) sharing a string of n-bit true random number $k_1$ between the digital asset authentication center and the original user and performing pre-generation of the irreducible polynomial q(x);

2) sharing secret keys $k_2$ and u between the digital asset authentication center and the original user; obtaining a hash function $h_q$, $k_2$ based on a linear feedback shift register by the digital asset authentication center from using the secret key $k_2$ of the digital asset authentication center as an input random number together with the pre-generated irreducible polynomial q(x); then computing a hash value of the digital asset M, which is denoted as $h_{q,k_2}(M)$, by using the hash function $h_{q,k_2}$;

3) encrypting the hash value $h_{q,k_2}(M)$ using its own secret key u by the digital asset authentication center, and sending an encrypted hash value $h_{q,k_2}(M)$ (u to the original user from the digital asset authentication center; performing decryption of a received result using the shared secret key u to obtain $h_{q,k_2}(M)$ by the original user; subsequently, obtaining, by the original user, a hash function $h'_{q,k_2}$ based on a linear feedback shift register using the secret key $k_2$, serving as an input random number together with the pre-generated irreducible polynomial; computing a hash value of the digital asset M, which is denoted as $h'_{q,k_2}(M)$, using the hash function $h'_{q,k_2}$; in a case that the hash value $h'_{q,k_2}(M)$ is equal to the hash value $h_{q,k_2}(M)$ obtained through decryption, authentication succeeds; otherwise, authentication fails, returning and authenticating again.

9. The method of claim 8, wherein generating the authentication document of the digital asset M by each of the digital asset authentication center and the original user comprises:

after the authentication of the digital M is successful, generating an authentication document $H_M$ of the digital asset M by each of the digital asset authentication center and the original user, each using the hash value $h_{q,k_2}(M)$, the service serial number o2 of sending the digital asset M and institution information da of the digital asset authentication center, that is: $H_M = (h_{q,k_2}(M), o2, da)$.

10. The method of claim 9, wherein generating the signature document $doc_M$ comprises:

generating the signature document $doc_M$ by the original user, using the authentication document $H_M$ of the digital asset M, the one-time CA certification otCA, the service serial number o3 of quantum digital signature, the institution information ca of the CA authentication center and the institution information da of the digital asset authentication center, that is:

$$doc_M = (H_M, otCA, o3, ca, da).$$

11. The method of claim 10, wherein conducting the three-party quantum digital signature for the signature document $doc_M$ by the CA authentication center, the digital asset authentication center and the original user, where the original user is a signing party, the CA authentication center and the digital asset authentication center are signature verification parties; when successfully verifying the signature by both the CA authentication center and the digital asset authentication center is successful, conducting an identity verification by the CA authentication center and conducting a document verification by the digital asset verification center comprises:

S1. Obtaining, by the original user, a true random number locally to generate an irreducible polynomial l(x), and denoting a character string as str3, which is formed by coefficients of terms of respective orders except the highest order of the irreducible polynomial l(x);

S2. performing a secret key negotiation between the original user and the CA authentication center, and respectively obtaining a shared secret key $x_1$ and a shared secret key $y_1$ by the original user and the CA authentication center; performing a secret key negotiation between the original user and the digital asset authentication center, and respectively obtaining a shared secret key $x_2$ and a shared secret key $y_2$ by the original user and the digital asset authentication center; wherein, the length of $x_1$ is identical to the length of $x_2$, the length of $y_1$ is identical to the length of $y_2$, and the length of $y_1$ is twice as long as the length of $x_1$; performing an XOR operation on the secret keys $x_1$, $y_1$, $x_2$ and $y_2$ by the original user to obtain secret keys $x_3$ and $y_3$ as follows:

$$x_3 = x_1 \oplus x_2;$$

$$y_3 = y_1 \oplus y_2;$$

S3. generating a hash function $h_{l,x_3}$ by the original user by choosing the irreducible polynomial $l(x)$ and the secret key $x_3$ used as an input random number; performing a hash operation on the signature document $doc_M$ using the hash function $h_{l,x_3}$ to obtain a hash value $h_{l,x_3}(doc_M)$; encrypting, by the original user, the hash value $h_{l,x_3}(doc_M)$ and the character string str3 using the secret key $y_3$, and transmitting an encrypted value $(h_{l,x_3}(doc_M), str3) \oplus y_3$ and the signature document $doc_M$ to the CA authentication center by the original user;

S4. after receiving $(h_{l,x_3}(doc_M), str3) \oplus y_3$ and the signature document $doc_M$ by the CA authentication center, sending its secret keys $x_1$, $y_1$, $(h_{l,x_3}(doc_M), str3) \oplus y_3$ and the signature document $doc_M$ from CA authentication center to the digital asset authentication center; the digital asset authentication center, upon reception of the secret keys and the signature document, sending its secret keys $x_2$ and $y_2$ to the CA authentication center; an exchange of information of the two parties taking place over an authenticated channel to prevent information tampering; at this time, the CA authentication center and the digital asset authentication center both possessing the secret keys $x_1$, $y_1$, $x_2$, $y_2$, $(h_{l,x_3}(doc_M), str3) \oplus y_3$ and the signature document $doc_M$;

S5. after completing the exchange of information, performing an XOR operation on the secret keys $x_1$, $y_1$, $x_2$, $y_2$ owned by the CA authentication center to obtain secret keys $x_3'$ and $y_3'$, wherein:

$$x_3' = x_1 \oplus x_2;$$

$$y_3' = y_1 \oplus y_2;$$

decrypting the encrypted value $(h_{l,x_3}(doc_M), str3) y_3$ using the secret key $y_3'$ by the CA authentication center to obtain $h_{l,x_3}(doc_M)$ and the character string str3; then generating an irreducible polynomial $l'(x)$ by successively corresponding respective bits in the character string str3 to coefficients of terms of respective orders other than a highest order of the polynomial, wherein a coefficient of the highest order is 1; generating a hash function $h_{l',x_3'}$ using the irreducible polynomial $l'(x)$ and the secret key $x_3'$ as an input random number by the CA authentication center; performing, by the CA authentication center, a hash operation using the hash function $h_{l,x_3}$ on the signature document $doc_M$ to obtain a hash value $h_{l,x_3}(doc_M)$; comparing the computed hash value $h_{l,x_3}(doc_M)$ with the decrypted $h_{l,x_3}(doc_M)$ by the CA authentication center; when being equal, then a signature verification succeeds, otherwise a signature verification fails;

S6. verifying the signature by the digital asset authentication center by using the same way as the CA authentication center;

S7. in a case that the signature is successfully verified by both the CA authentication center and the digital asset authentication center, conducting an identity verification by the CA authentication center and conducting a document verification by the digital asset verification center; the specific procedure is: comparing the otCA in the signature document $doc_M$ of the CA authentication center with the otCA generated by the CA authentication center to determine consistency, in a case of being consistent, an identity verification succeeds; comparing the $H_M$ in the signature document $doc_M$ of the digital asset authentication center with the $H_M$ generated by the digital asset authentication center to determine consistency, in a case of being consistent, a document verification succeeds; when the signature verification, the identity verification and the document verification are all successful, ownership confirmation of the digital asset is successful while producing a service serial number o4 and entering next step; otherwise, a current ownership confirmation of the digital asset is unsuccessful, and the ownership confirmation of the digital asset is terminated or a new ownership confirmation is initiated.

12. The method of claim 9, wherein generating the ownership confirmation document of the digital asset M by the original user comprises:

denoting the timestamp corresponding to a successfully confirming ownership operation of the digital asset as timestamp1 by the original user; next, generating an ownership confirmation document $\overline{M}$ of the digital asset M using the hash value $h_{l,x_3}(doc_M)$ of the signature document, the signature $doc_M$, the timestamp timestamp1, and the service serial number o4 by the original user:

$$\overline{M} = (h_{l,x_3}(doc_M), doc_M, timestamp1, o4).$$

13. The method of claim 1, wherein:

the digital asset authentication center comprises a first interface unit, a first quantum security unit connected to the first interface unit, and a digital asset authentication unit connected to the first quantum security unit;

the first interface unit is configured to allow connection and communication interaction between the digital asset authentication center and other exterior systems;

the first quantum security unit comprises a first hash algorithm module, a first encryption module, a first decryption module, a first true quantum random number generator and a first secret key storage module which are sequentially connected; the first hash algorithm module is configured to generate hash functions to perform hash computation of information; the first encryption module is configured to perform encryption operation; the first decryption module is configured to perform decryption operation; the first true quantum random number generator is configured to generate true random numbers; the first secret key storage module is configured to store secret keys;

the digital asset authentication unit includes a digital asset storage module, a first authentication module, a quantum digital signature module, a first logging module and a first backup module which are sequentially connected; the digital asset storage module is configured to store documents; the first authentication module is configured to perform authentication operations; the quantum digital signature module is configured to perform quantum digital signing operation for generated signature documents; the first logging module is configured to record a signature verification result of a quantum digital signature and a result of authentication;

the first backup module is configured to back up recorded data of the first logging module.

14. A method for tracing to a source of digital assets based on hash algorithm, comprising:
   (1) an initial access moment: confirming an ownership of digital asset M by the original user using the method of any one of claim 1-11; after the confirmation is successful, obtaining an ownership confirmation document, which is a unique identity of the digital asset at the initial access moment; and uploading the digital asset M along with the ownership confirmation document to a digital asset server;
   (2) an access moment: when accessing the digital asset M on the digital asset server by an access user, generating a subsidiary document in real time by the digital asset server; the subsidiary document comprises but is not limited to a timestamp and identity information of the access user;
   (3) constructing a unique identity of the digital asset at the access moment: conducting an authentication of an identity document by the digital asset server and the digital asset authentication center, obtaining a hash value of the identity document, which is a unique identity of the digital asset at a current access moment; forming the identity document by nesting a unique identity of the digital asset of a previous access moment and a subsidiary document of the current access moment;
   (4) traceability analysis: obtaining a unique identity of the digital asset at a final access moment by repeating step (2) and step (3) a multitude of times; tracing the history of the unique identity of the digital asset at the final access moment, thus completing the traceability analysis of the digital asset.

15. The method of claim 14, wherein when accessing the digital asset M on the digital asset server by an access user, generating a subsidiary document in real time by the digital asset server comprises:
   denoting the initial access moment as moment to, at which the digital asset M is confirmed and uploaded to the digital asset server;
   1) when the access user accessing the digital asset M at a moment $t_1$, generating a subsidiary document $c_1$ with a length of $n_1$ in real time by the digital asset server;
   2) when the access user accessing the digital asset M at a moment $t_2$, generating a subsidiary document $c_2$ with a length of $n_2$ in real time by the digital asset server;
   3) in a similar manner, when the access user accessing the digital asset M at a moment $t_k$, generating a subsidiary document c with a length of $n_k$ in real time by the digital asset server; after undergoing the above-mentioned procedure, generating a subsidiary document correspondingly every time the digital asset M is accessed.

16. The method of claim 15, wherein conducting the authentication of the identity document by the digital asset server and the digital asset authentication center, obtaining a hash value of the identity document, which is a unique identity of the digital asset at a current access moment; forming the unique identity by nesting a unique identity of the digital asset of a previous access moment and a subsidiary document of the current access moment comprises:
   1) at moment to, confirming the ownership of the digital asset M to obtain an ownership confirmation document $\overline{c_0}$ of the digital asset M; $\overline{c_0}$ is a unique identity of the digital asset accessed at moment to;
   2) at moment $t_1$, forming an identity document $\tilde{c}_1=(\overline{c}_0, c_1)$ by nesting the unique identity $\overline{c}_0$ of the digital asset M accessed at access moment $t_0$, with the subsidiary document $c_1$ of length $n_1$ generated in real time by accessing the digital asset M by the access user at moment $t_1$; authenticating the identity document $\tilde{c}_1$ by the digital asset server and the digital asset authentication center; obtaining after authentication, a hash value $\overline{c_1}$ of the identity document $\tilde{c}_1$; the hash value $\tilde{c}_1$ is a unique identity of the digital asset accessed at moment $t_1$;
   3) in a similar manner, at moment $t_k$, forming an identity document $\tilde{c}k=(\overline{c}_{k-1}, c_k)$ by nesting a unique identity $\overline{c}_{k-1}$ of the digital asset accessed at access moment $t_{k-1}$ by the digital asset M, with a subsidiary document $c_k$ of length $n_k$ generated in real time by the digital asset M accessed by the access user at moment $t_k$; authenticating the identity document $\tilde{c}_k=(\overline{c}_{k-1}, c_k)$ by the digital asset server and the digital asset authentication center using the same approach used to authenticate the identity document $\tilde{c}_1$; obtaining after authentication, a hash value $\overline{c_k}$ of the identity document $\tilde{c}_k$; the hash value $\overline{c_k}$ is a unique identity of the digital asset accessed at moment $t_k$.

17. The method of claim 16, wherein authenticating the identity document $\tilde{c}_1$ by the digital asset server and the digital asset authentication center; obtaining after authentication, the hash value $\overline{c_1}$ of the identity document $\tilde{c}_1$ comprises:
   approach 5: 1) obtaining and choosing a set of n-bit true random number $z_1$ locally by the digital asset server; generating an irreducible polynomial f(x) of order n using the n-bit true random number $z_1$, and denoting an n-bit character string as str4, formed by coefficients of terms of respective orders except the highest order of the irreducible polynomial;
   2) sharing two sets of quantum secret keys $z_2$ and j by the digital asset server and the digital asset authentication center; the length of $z_2$ is n and the length of j is 2n, and using the two secret keys respectively as an input random number for a hash function and for encryption of the hash function,
   3) Obtaining a hash function $h_{f,z_2}$ based on a linear feedback shift register by the digital asset server from choosing the irreducible polynomial f(x) of order n and the shared secret key $z_2$ as an input random number; then computing a hash value of $\tilde{c}_1$, which is denoted as $h_{f,z_2}(\tilde{c}_1)$, using the hash function; encrypting, by the digital asset server, the hash value and the character string str4 by using the shared secret key j, and performing the encryption using an XOR operation to obtain an encryption result $\oplus(h_{f,z_2}(\tilde{c}_1), str4)$;
   4) sending the encryption result $j\oplus(h_{f,z_2}(\tilde{c}_1),str4)$ from the digital asset server to the digital asset authentication center; after the digital asset authentication center receiving the encryption result, decrypting the encryption result using the shared secret key j by the digital asset authentication center to obtain the hash value $h_{f,z_2}(\tilde{c}_1)$ and the character string str4; generating an irreducible polynomial f'(x) of order n on the GF(2) domain by the digital asset authentication center by successively corresponding respective bits in the character string str4 to coefficients of terms of respective orders other than a highest order of the polynomial, wherein a coefficient of the highest order is 1; generating a hash function $h'_{f,z_2}$ based on a linear feedback shift register by the digital asset authentication center from further choosing the irreducible polynomial f'(x) and the shared secret key string $z_2$ which is used as an input random number; computing a hash value of $\tilde{c}_1$, which is denoted as $h'_{f,z_2}(\tilde{c}_1)$, by using the hash function $h'_{f,z_2}$; in a case that the computed hash value $h'_{f,z_2}(\tilde{c}_1)$ by the digital asset authentication center is equal to the hash value $h_{f,z_2}(\tilde{c}_1)$ obtained through decryption, the authentication succeeds, the digital asset server storing the hash value $h_{f,z_2}(\tilde{c}_1)$, that being $\overline{c_1}$; otherwise, the authentication fails, returning and authenticating again; or, approach 6: 1) sharing a string of n-bit true random number $z_1$ and performing pre-generation of an irreducible polynomial f(x) by the digital asset server and the digital asset authentication center;

2) sharing secret keys $z_2$ and j between the digital asset server and the digital asset authentication center; using the secret key $z_2$ of the digital asset server as an input random number, together with the pre-generated irreducible polynomial f(x) to obtain a hash function $h_{f,z_2}$ based on a linear feedback shift register; computing a hash value of $\tilde{c}_1$, which is denoted as $h_{f,z_2}(\tilde{c}_1)$, using the hash function $h_{f,z_2}$;

3) encrypting the hash value $h_{f,z_2}(\tilde{c}_1)$ using the secret key j of the digital asset server, and sending an encrypted hash value $h_{f,z_2}(\tilde{c}_1) \oplus j$ and $\tilde{c}_1$ from the digital asset server to the digital asset authentication center; performing decryption of a received result using the shared secret key j to obtain $h_{f,z_2}(\tilde{c}_1)$ by the digital asset authentication center; subsequently, obtaining a hash function $h'_{f,z_2}$ based on a linear feedback shift register by the digital asset authentication center, using the secret key $z_2$ of the digital asset authentication center as an input random number together with the pre-generated irreducible polynomial p(x); computing a hash value of $\tilde{c}_1$, which is denoted as $h'_{f,z_2}(\tilde{c}_1)$, using the hash function $h'_{f,z_2}$; in a case that the hash value $h'_{f,z_2}(\tilde{c}_1)$ is equal to the hash value $h_{f,z_2}(\tilde{c}_1)$ obtained through decryption, the authentication succeeds; otherwise, the authentication fails, returning and authenticating again.

* * * * *